United States Patent
Liu et al.

(10) Patent No.: US 11,483,583 B2
(45) Date of Patent: Oct. 25, 2022

(54) BIDIRECTIONAL OPTICAL FLOW BASED VIDEO CODING AND DECODING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/405,374

(22) Filed: Aug. 18, 2021

(65) Prior Publication Data

US 2021/0385482 A1 Dec. 9, 2021

Related U.S. Application Data

(63) Continuation of application No. PCT/CN2020/082941, filed on Apr. 2, 2020.

(30) Foreign Application Priority Data

Apr. 2, 2019 (WO) ................ PCT/CN2019/080914

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/132* (2014.11); *H04N 19/159* (2014.11); *H04N 19/176* (2014.11)

(58) Field of Classification Search
CPC ... H04N 19/139; H04N 19/513; H04N 19/577
See application file for complete search history.

(56) References Cited

U.S. PATENT DOCUMENTS 10,390,029 B2 8/2019 Ye et al.
10,448,010 B2 10/2019 Chen et al.
(Continued)

FOREIGN PATENT DOCUMENTS

CN 102754444 A 10/2012
CN 102939753 A 2/2013
(Continued)

OTHER PUBLICATIONS

Affine motion compensation using 2x2 sub-block; Han—Mar. 2019. (Year: 2019).*

(Continued)

*Primary Examiner* — Luis Perez-Fuentes
(74) *Attorney, Agent, or Firm* — Perkins Coie LLP

(57) ABSTRACT

Devices, systems and methods for sample refinement and filtering method for video coding are described. In an exemplary aspect, a method for video processing includes modifying, for a conversion between a block of a video and a bitstream representation of the video, a refinement value for a prediction sample in the block by applying a clipping operation to refinement value. The refinement value is derived based on a gradient value of an optical flow coding process. An output of the clipping operation is within a range. The method also includes refining the prediction sample based on the refinement value and performing the conversion based on the refined prediction sample.

20 Claims, 19 Drawing Sheets

(51) Int. Cl.
  *H04N 19/132* (2014.01)
  *H04N 19/159* (2014.01)
  *H04N 19/176* (2014.01)

(56) References Cited

U.S. PATENT DOCUMENTS

| | | |
|---|---|---|
| 10,523,964 B2 | 12/2019 | Chuang et al. |
| 10,560,712 B2 | 2/2020 | Zou et al. |
| 10,757,417 B2 | 8/2020 | Zhang et al. |
| 10,778,999 B2 | 9/2020 | Li et al. |
| 10,819,891 B2 | 10/2020 | Wang et al. |
| 10,841,609 B1 | 11/2020 | Liu et al. |
| 10,904,565 B2 | 1/2021 | Chuang et al. |
| 2013/0107958 A1 | 5/2013 | Shimada et al. |
| 2013/0259122 A1 | 10/2013 | Sugio et al. |
| 2015/0016550 A1 | 1/2015 | Kim et al. |
| 2018/0098066 A1 | 4/2018 | Lee et al. |
| 2018/0103257 A1 | 4/2018 | Zheng et al. |
| 2018/0199057 A1 | 7/2018 | Chuang et al. |
| 2018/0241998 A1 | 8/2018 | Chen et al. |
| 2018/0262773 A1 | 9/2018 | Chuang et al. |
| 2018/0278950 A1 | 9/2018 | Chen et al. |
| 2018/0316929 A1 | 11/2018 | Li et al. |
| 2018/0376166 A1 | 12/2018 | Chuang et al. |
| 2019/0014342 A1 | 1/2019 | Li et al. |
| 2019/0020895 A1* | 1/2019 | Liu ................. H04N 19/176 |
| 2019/0045214 A1* | 2/2019 | Ikai ................. H04N 19/105 |
| 2019/0045215 A1 | 2/2019 | Chen et al. |
| 2019/0104323 A1 | 4/2019 | Baylon et al. |
| 2019/0387250 A1 | 12/2019 | Boyce et al. |
| 2020/0045310 A1 | 2/2020 | Chen et al. |
| 2020/0084457 A1* | 3/2020 | Abe ................. H04N 19/159 |
| 2020/0145688 A1 | 5/2020 | Zou et al. |
| 2020/0213594 A1 | 7/2020 | Liu et al. |
| 2020/0213612 A1 | 7/2020 | Liu et al. |
| 2020/0221122 A1* | 7/2020 | Ye ................. H04N 19/103 |
| 2020/0296405 A1 | 9/2020 | Huang et al. |
| 2020/0304826 A1 | 9/2020 | Li et al. |
| 2020/0314443 A1* | 10/2020 | Huang ................. H04N 19/513 |
| 2020/0359029 A1 | 11/2020 | Liu et al. |
| 2020/0382771 A1 | 12/2020 | Liu et al. |
| 2020/0382795 A1* | 12/2020 | Zhang ................. H04N 19/50 |
| 2020/0396453 A1 | 12/2020 | Zhang et al. |
| 2020/0396465 A1 | 12/2020 | Zhang et al. |
| 2020/0404255 A1* | 12/2020 | Zhang ................. H04N 19/139 |
| 2021/0067783 A1* | 3/2021 | Liu ................. H04N 19/70 |
| 2021/0092390 A1* | 3/2021 | Chen ................. H04N 19/82 |
| 2021/0227211 A1* | 7/2021 | Liu ................. H04N 19/109 |
| 2021/0266530 A1* | 8/2021 | Liu ................. H04N 19/517 |
| 2021/0281855 A1* | 9/2021 | Skupin ................. H04N 19/176 |
| 2021/0368198 A1 | 11/2021 | Zhang et al. |
| 2021/0368199 A1* | 11/2021 | Zhang ................. H04N 19/132 |
| 2021/0368203 A1* | 11/2021 | Zhang ................. H04N 19/513 |
| 2021/0377558 A1 | 12/2021 | Xiu et al. |
| 2021/0385482 A1* | 12/2021 | Liu ................. H04N 19/82 |
| 2022/0070490 A1 | 3/2022 | Zhang et al. |

FOREIGN PATENT DOCUMENTS

| | | |
|---|---|---|
| CN | 108541375 A | 2/2013 |
| CN | 107211151 A | 9/2017 |
| CN | 107925772 A | 4/2018 |
| CN | 107925773 A | 4/2018 |
| CN | 108293118 A | 7/2018 |
| CN | 108781294 A | 11/2018 |
| CN | 109076237 A | 12/2018 |
| CN | 109479130 A | 3/2019 |
| EP | 3413563 A1 | 12/2018 |
| WO | 2015179898 A1 | 12/2015 |
| WO | 2016130801 A1 | 8/2016 |
| WO | 2017142939 A1 | 8/2017 |
| WO | 2018128417 A1 | 8/2017 |
| WO | 2017184970 A1 | 10/2017 |
| WO | 2018130206 A1 | 7/2018 |
| WO | 2018166357 A1 | 9/2018 |
| WO | 2018169989 A1 | 9/2018 |
| WO | 2018199468 A1 | 11/2018 |
| WO | 2018237303 A1 | 12/2018 |

OTHER PUBLICATIONS

Simplified prediction refinement for affine motion compensation; Han—Mar. 2019. (Year: 2019).*
Library USPTO NPL query; 2020 (Year: 2020).*
Simplification of bi-directional optical flow; Xiu—2019. (Year: 2019).*
Prediction refinement with optical flow for affine mode; Luo—Mar. 2019. (Year: 2019).*
Complexity reduction of the bit-width control for bi-directional optical flow; Xiu—2018. (Year: 2018).*
Karczewicz et al. "Geometry Tranformation-based Adaptive In-Loop Filter," 2016, IEEE Qualcomm Technologies Inc. San Diego, CA, USA.
International Search Report and Written Opinion from International Patent Application No. PCT/CN2020/082941 dated Jun. 30, 2020 (12 pages).
International Search Report and Written Opinion from International Patent Application No. PCT/CN2020/082976 dated Jul. 1, 2020 (11 pages).
Final Office Action from U.S. Appl. No. 17/392,658 dated Mar. 16, 2022.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH. Mar. 19-27, 2019, document JVET-N1001, 2019.
Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.
Chen et al. "BoG Report on CE2 Sub-Block Based Motion Prediction-Related Contributions," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0776, 2019.
Chuang et al. "CE2-Related: Phase-Variant Affine Subblock Motion Compensation," Joint Video Experts Team (JVET) of ITU-T SG 16 WP 3 and ISO/IEC JTC 1/SC 29/WG 11, 14th Meeting Geneva, CH, Mar. 19-27, 2019, document JVET-N0510, 2019.
Chujoh et al. "Non-CE9: An Improvement of BDOF," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0063, 2019.
He et al. "Unified Syntax for JVET-O0184/O0250/O0504 on DMVR and BDOF Flag," Joint Video Experts Team (JVET) of ITU-T SG 16 WP 3 and ISO/IEC JTC 1/SC 29/WG 11, 15th Meeting, Gothenburg, Se, Jul. 3-12, 2019, document JVET-O1140, 2019.
Henkel et al. "Non-CE4: Switched Half-Pel Interpolation Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0309, 2019.
Henkel et al. "CE4: Switchable Interpolaton Filter (CE4-1.1, CE4-1.2, CE4-1.3, CE4-1.4, CE4-1.5, CE4-1.6, CE4-1.7)," Joint Video Experts Team (JVET) of ITU-T SG 16 WP 3 and ISO/IEC JTC 1/SC 29/WG 11, 15th Meeting, Gothenburg, SE Jul. 3-12, 2019, document JVET-O0057, 2019.
Kim et al. "Non-CE3: Determination of Wide-Angle Mode Using the Size of a Coding Block," JVET-N0216, Mar. 2019.
Li et al. "Non-CE-2: Combination of Affine MV Clip and Prediction Refinement with Optical Flow," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0737, 2019.

(56) References Cited

OTHER PUBLICATIONS

Luo et al. "CE4: Prediction Refinement with Optical Flow for Affine Mode (Test 2.1)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0070, 2019.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.
Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0256, 2018.
Xiu et al. "Simplifications on Bi-Directional Optical Flow (BDOF)," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0487, 2019.
Zhang et al. "CE2-5.5: History-Parameter-based Affine Model Inheritance," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0263, 2019.
JEM-7.0: https://jvet.hhi.fraunhofer.de/svn/svn_HMJEMSoftware/tags/HM-16.6-JEM-7.0.
International Search Report and Written Opinion from International Patent Application No. PCT/CN2020/085658 dated Jul. 20, 2020 (9 pages).
International Search Report and Written Opinion from International Patent Application No. PCT/CN2020/085662 dated Jul. 21, 2020 (9 pages).
International Search Report and Written Opinion from International Patent Application No. PCT/CN2020/085663 dated Jul. 14, 2020 (10 pages).
International Search Report and Written Opinion from International Patent Application No. PCT/CN2020/085666 dated Jul. 7, 2020 (9 pages).
International Search Report and Written Opinion from International Patent Application No. PCT/CN2020/094156 dated Sep. 2, 2020 (10 pages).
Notice of Allowance from U.S. Appl. No. 17/392,719 dated Oct. 14, 2021.
Non Final Office Action from U.S. Appl. No. 17/392,658 dated Nov. 26, 2021.
Non Final Office Action from U.S. Appl. No. 17/392,778 dated Nov. 26, 2021.
Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L1001, 2018. (Related Pages: pp. 164-167, sentions 8.4.6.4 and 8.4.6.5).
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.(Related Pages: pp. 25-29).
Lu et al. "CE12: Mapping Functions (Test CE12-1 and CE12-2)," Joint Video Experts Team (JVET) of ITU-t SG 16 WP 3 and ISO/IEC JTC 1/SC 29/WG 11, 13th Meeting, Marrakech, MA, Jan. 9-18, 2019, document JVET-M0427, 2019. (Related Pages: pp. 7-10).
Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0236r5, 2019. (Related Pages: pp. 1-3).
Office Action from Indian Patent Application No. 202147046022 dated Apr. 13, 2022.
Xiu et al. "CE9-Related: Improvements on Bi-Directional Optical Flow (BDOF)," Joint Video Experts Team (JVET) of TU-T SG 16 WP 3 and ISO/IEC JTC 1/SC 29/WG 11, 14th Meeting, Geneva, CH, 19-278 Mar. 2019, document JVET-N0325, 2019. (cited in EP 207904491 EESR mailed Jun. 15, 2022).
Extended European Search Report from European Patent Application No. 20782029.1 dated Jul. 15, 2022 (8 pages).
Extended European Search Report from European Patent Application No. 20790449.1 dated Jun. 15, 2022 (7 pages).

\* cited by examiner

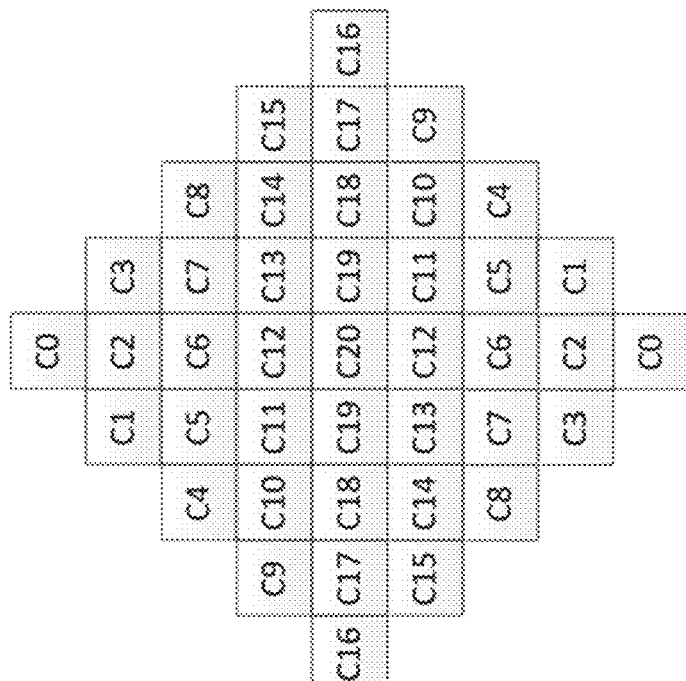
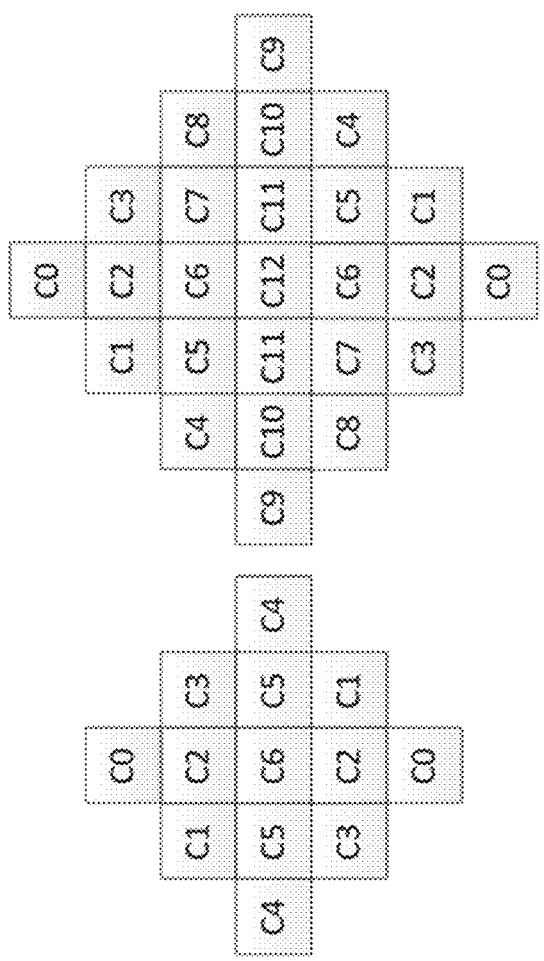
FIG. 2A   FIG. 2B   FIG. 2C

BIDIRECTIONAL OPTICAL FLOW BASED VIDEO CODING AND DECODING

CROSS REFERENCE TO RELATED APPLICATIONS

This application is a continuation of International Patent Application No. PCT/CN2020/082941, filed on Apr. 2, 2020, which claims the priority to and benefit of International Patent Application No. PCT/CN2019/080914, filed on Apr. 2, 2019. The aforementioned applications are incorporated by reference as part of the disclosure of this application.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to sample refinement and filtering methods for video coding are described. The described methods may be applied to both the existing video coding standards, such as High Efficiency Video Coding (HEVC), and future video coding standards, such as Versatile Video Coding (VVC) or codecs.

In one representative aspect, the disclosed technology may be used to provide a method for video processing. This method includes applying, for a conversion between a current block of a video and a bitstream representation of the video, a clipping operation to a weighted average of differences between a pixel and neighboring pixels of the pixel in the current block. The method also includes performing the conversion based on an output of the clipping operation.

In another representative aspect, the disclosed technology may be used to provide a method for video processing. This method includes configuring, for a conversion between a current block of a video and a bitstream representation of the video, a filtering process based on a set of neighboring pixels of the current block. The method also includes performing the conversion based on and output of the filtering process.

In another representative aspect, the disclosed technology may be used to provide a method for video processing. This method includes modifying, for a conversion between a block of a video and a bitstream representation of the video, a refinement value for a prediction sample in the block by applying a clipping operation to refinement value. The refinement value is derived based on a gradient value of an optical flow coding process. An output of the clipping operation is within a range. The method also includes refining the prediction sample based on the modified refinement value and performing the conversion based on the refined prediction sample.

In another representative aspect, the disclosed technology may be used to provide a method for video processing. This method includes modifying, for a conversion between a block of a video and a bitstream representation of the video, a gradient value in an optical flow coding process. The method also includes performing a subsequence prediction operation based on the modified gradient value for the conversion.

In another representative aspect, the disclosed technology may be used to provide a method for video processing. This method includes configuring, for a current video block, a one-dimensional filtering process, and reconstructing, based on the one-dimensional filtering process, the current video block from a corresponding bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 2A, 2B and 2C show examples of geometry transformation-based adaptive loop filter (GALF) filter shapes.

Figures 4A, 4B:
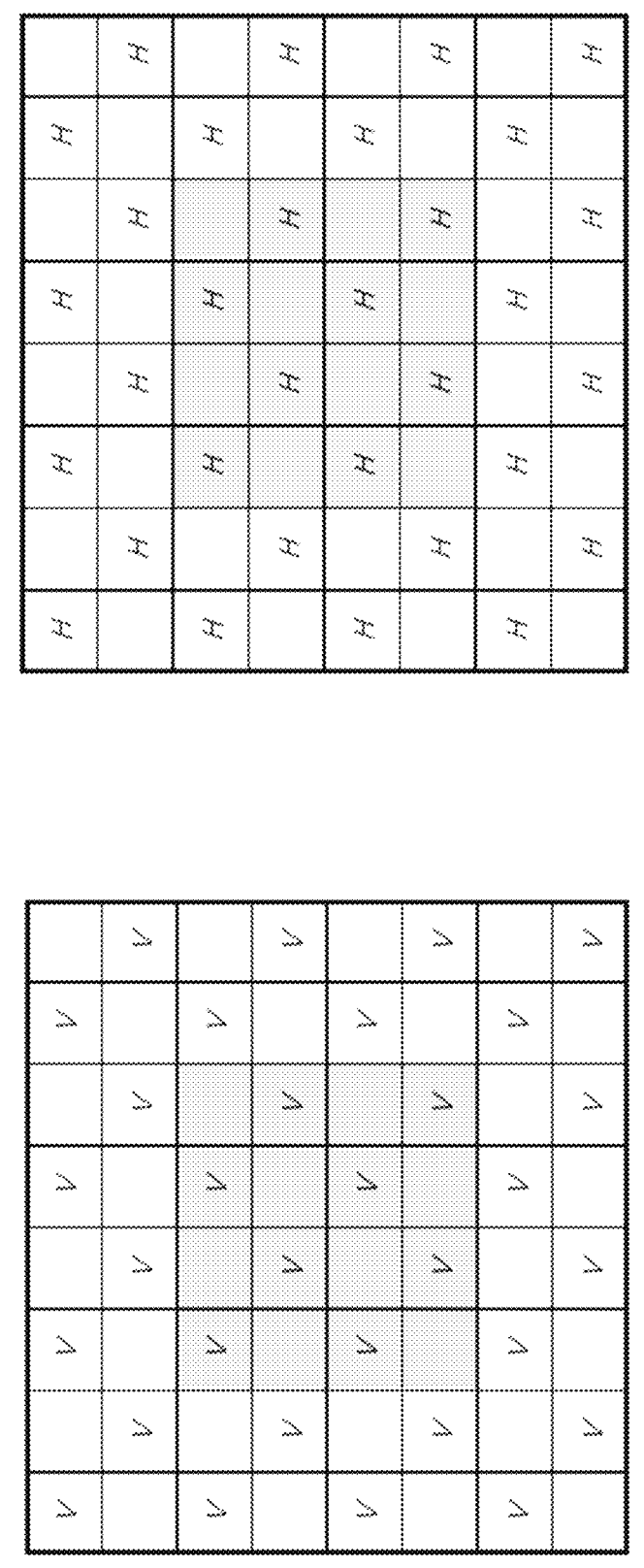
Figures 4C, 4D:
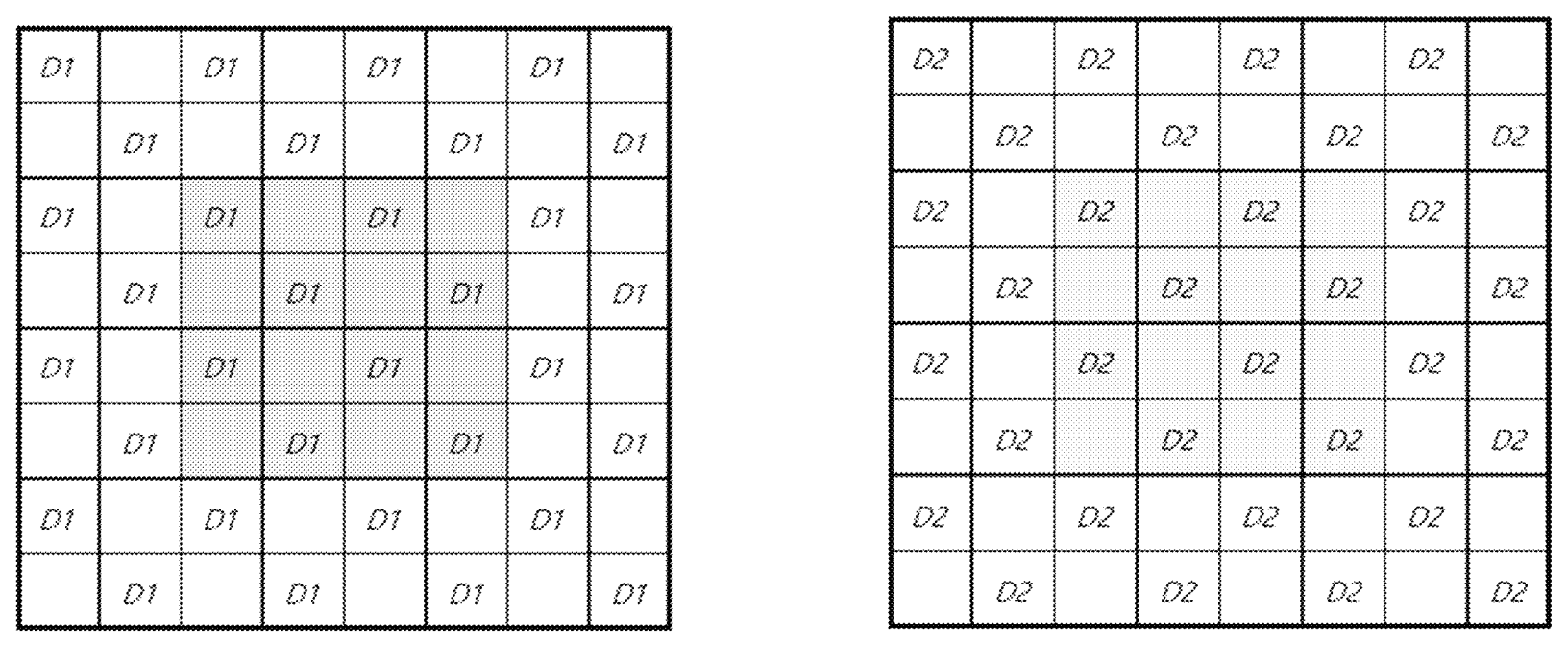

FIGS. 4A-4D show example subsampled Laplacian calculations for adaptive loop filter (ALF) classification.

FIG. 5 shows an example of a luma filter shape.

DETAILED DESCRIPTION

Figure 1:
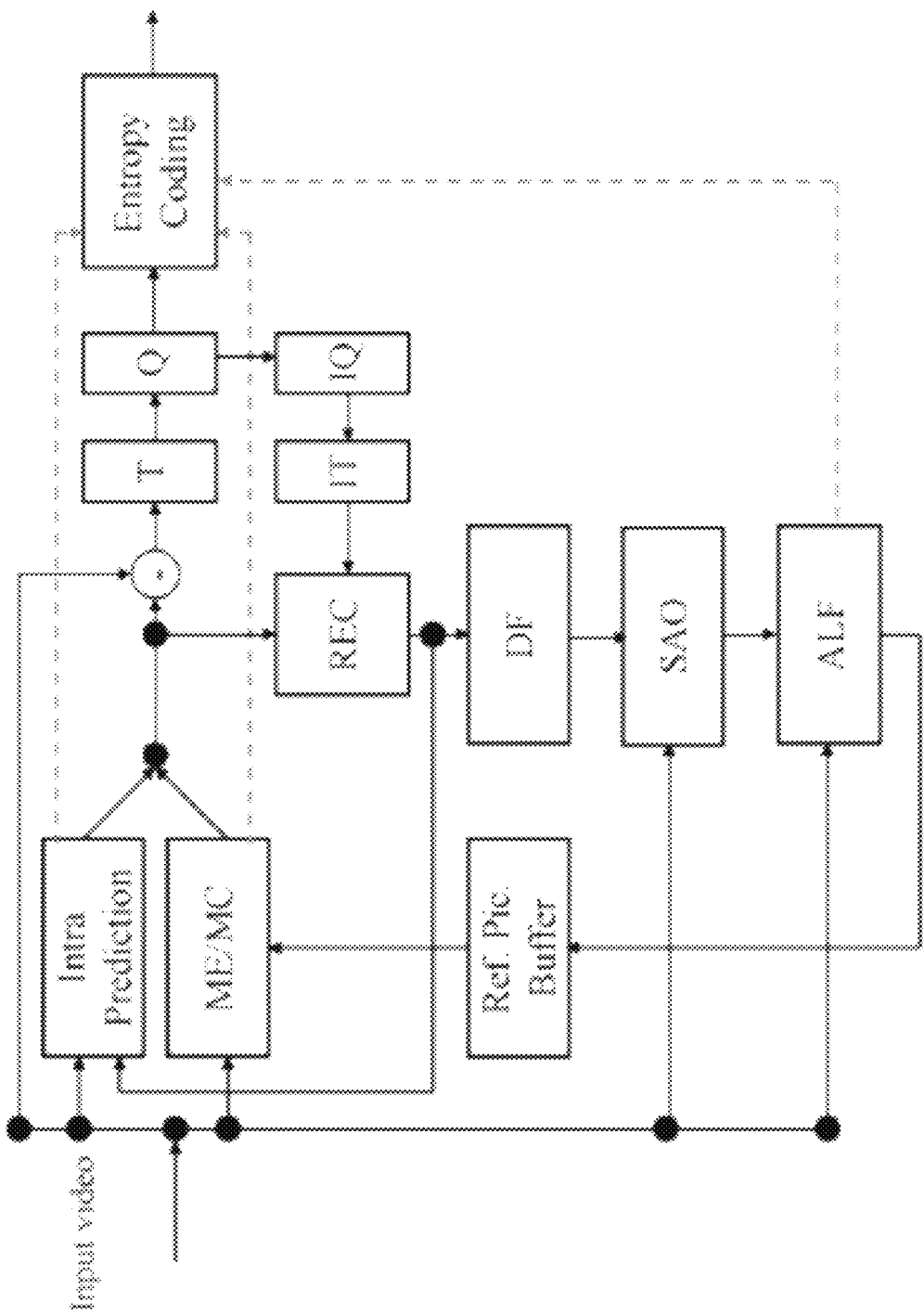
FIG. 1 shows an example of an encoder block diagram for video coding.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Examples of Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

1.1 The 4:4:4 Color Format

Each of the three Y'CbCr components have the same sample rate, thus there is no chroma subsampling. This scheme is sometimes used in high-end film scanners and cinematic post production.

1.2 The 4:2:2 Color Format

The two chroma components are sampled at half the sample rate of luma, e.g. the horizontal chroma resolution is halved. This reduces the bandwidth of an uncompressed video signal by one-third with little to no visual difference.

1.3 The 4:2:0 Color Format

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2 Examples of the Coding Flow of a Typical Video Codec

FIG. 1 shows an example of encoder block diagram of VVC, which contains three in-loop filtering blocks: deblocking filter (DF), sample adaptive offset (SAO) and Adaptive Loop Filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

3 Examples of a Geometry Transformation-Based Adaptive Loop Filter in JEM

In the JEM, a geometry transformation-based adaptive loop filter (GALF) with block-based filter adaption is applied. For the luma component, one among 25 filters is selected for each 2×2 block, based on the direction and activity of local gradients.

3.1 Examples of Filter Shape

In the JEM, up to three diamond filter shapes (as shown in FIGS. 2A, 2B and 2C for the 5×5 diamond, 7×7 diamond and 9×9 diamond, respectively) can be selected for the luma component. An index is signalled at the picture level to indicate the filter shape used for the luma component. For chroma components in a picture, the 5×5 diamond shape is used.

3.1.1 Block Classification

Each 2×2 block is categorized into one out of 25 classes. The classification index C is derived based on its directionality D and a quantized value of activity $\hat{A}$, as follows:

$$C = 5D + \hat{A}. \tag{1}$$

To calculate D and Â, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k,l) - R(k,l-1) - R(k,l+1)|, \quad (2)$$

$$g_h = \sum_{k=i-2}^{i+3} \sum_{l=j-2}^{j+3} H_{k,l} \quad H_{k,l} = |2R(k,l) - R(k-1,l) - R(k+1,l)|, \quad (3)$$

$$g_{d1} = \sum_{k=i-2}^{i+3} \sum_{l=j-3}^{j+3} D1_{k,l}, \quad (4)$$

$$D1_{k,l} = |2R(k,l) - R(k-1,l-1) - R(k+1,l+1)|$$

$$g_{d2} = \sum_{k=i-2}^{i+3} \sum_{j=j-2}^{j+3} D2_{k,l}, \quad (5)$$

$$D2_{k,l} = |2R(k,l) - R(k-1,l+1) - R(k+1,l-1)|$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as Â. For both chroma components in a picture, no classification method is applied, i.e. a single set of ALF coefficients is applied for each chroma component.

3.1.2 Geometric Transformations of Filter Coefficients

Before filtering each 2×2 block, geometric transformations such as rotation or diagonal and vertical flipping are applied to the filter coefficients f(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k)$,

Vertical flip: $f_V(k,l) = f(k, K-l-1)$,

Rotation: $f_R(k,l) = f(K-l-1, k)$. (9)

Herein, K is the size of the filter and $0 \leq k, l \leq K-1$ are coefficients coordinates, such that location (0,0) is at the upper left corner and location (K-1, K-1) is at the lower right corner. The transformations are applied to the filter coefficients f(k,l) depending on gradient values calculated for that block. The relationship between the transformation and the four gradients of the four directions are summarized in Table 1.

TABLE 1

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

3.1.3 Signaling of Filter Parameters

In the JEM, GALF filter parameters are signaled for the first CTU, e.g., after the slice header and before the SAO parameters of the first CTU. Up to 25 sets of luma filter coefficients could be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signaling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (e.g., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter-coded frames to minimize signaling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f(k,l) can still be sent for this class in which case the coefficients of the filter which will be applied to the reconstructed image are sum of both sets of coefficients.

The filtering process of luma component can controlled at CU level. A flag is signaled to indicate whether GALF is applied to the luma component of a CU. For chroma component, whether GALF is applied or not is indicated at picture level only.

3.1.4 Filtering Process

At decoder side, when GALF is enabled for a block, each sample R(i,j) within the block is filtered, resulting in sample value R'(i,j) as shown below, where L denotes filter length, $f_{m,n}$ represents filter coefficient, and f(k,l) denotes the decoded filter coefficients.

$$R'(i,j)=\Sigma_{k=-L/2}^{L/2}\Sigma_{l=-L/2}^{L/2}f(k,l)\times R(i+k,j+l) \qquad (10)$$

3.1.5 Determination Process for Encoder Side Filter Parameters

Figure 3:
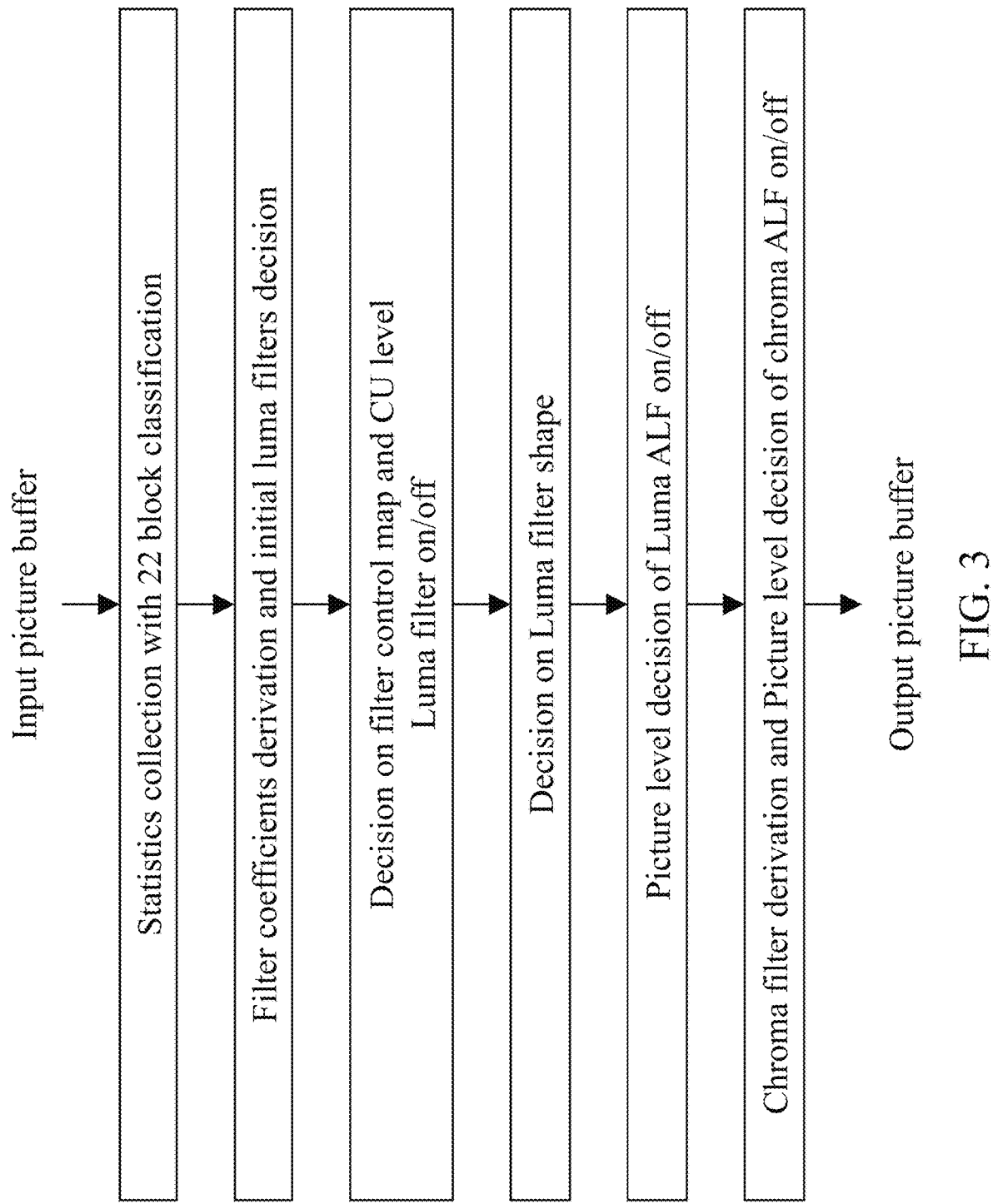
FIG. 3 shows an example of a flow graph for a GALF encoder decision.

Overall encoder decision process for GALF is illustrated in FIG. 3. For luma samples of each CU, the encoder makes a decision on whether or not the GALF is applied and the appropriate signalling flag is included in the slice header. For chroma samples, the decision to apply the filter is done based on the picture-level rather than CU-level. Furthermore, chroma GALF for a picture is checked only when luma GALF is enabled for the picture.

4 Examples of a Geometry Transformation-Based Adaptive Loop Filter in VVC

The current design of GALF in VVC has the following major changes compared to that in JEM:

(1) The adaptive filter shape is removed. Only 7×7 filter shape is allowed for luma component and 5×5 filter shape is allowed for chroma component.

(2) Temporal prediction of ALF parameters and prediction from fixed filters are both removed.

(3) For each CTU, one-bit flag is signaled whether ALF is enabled or disabled.

(3) Calculation of class index is performed in 4×4 level instead of 2×2. In addition, in some embodiments, sub-sampled Laplacian calculation method for ALF classification is utilized. More specifically, there is no need to calculate the horizontal/vertical/45 diagonal/135 degree gradients for each sample within one block. Instead, 1:2 sub-sampling is utilized.

5 Examples of a Region-Based Adaptive Loop Filter in AVS2

ALF is the last stage of in-loop filtering. There are two stages in this process. The first stage is filter coefficient derivation. To train the filter coefficients, the encoder classifies reconstructed pixels of the luminance component into 16 regions, and one set of filter coefficients is trained for each category using wiener-hopf equations to minimize the mean squared error between the original frame and the reconstructed frame. To reduce the redundancy between these 16 sets of filter coefficients, the encoder will adaptively merge them based on the rate-distortion performance. At its maximum, 16 different filter sets can be assigned for the luminance component and only one for the chrominance components. The second stage is a filter decision, which includes both the frame level and LCU level. Firstly the encoder decides whether frame-level adaptive loop filtering is performed. If frame level ALF is on, then the encoder further decides whether the LCU level ALF is performed.

5.1 Filter Shape

Figure 5:
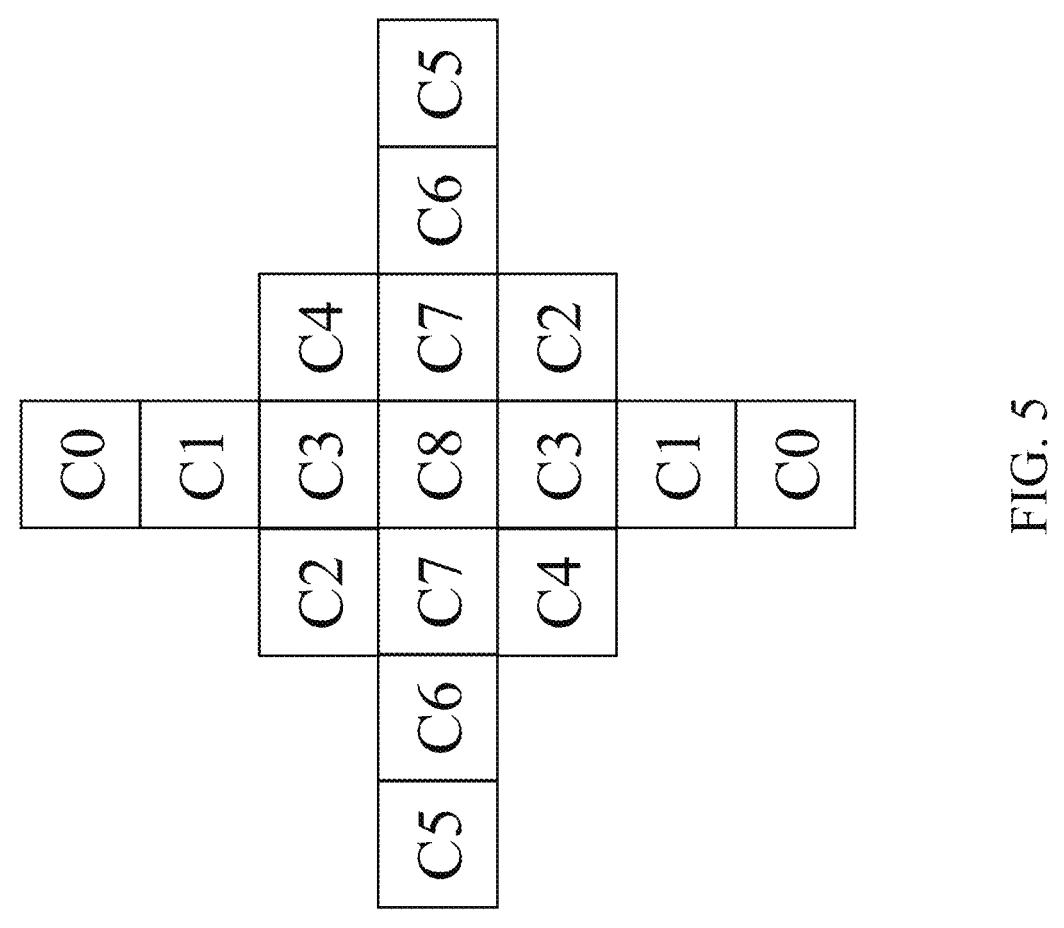

An example filter shape is a 7×7 cross shape superposing a 3×3 square shape, just as illustrated in FIG. 5 for both luminance and chroma components. Each square in FIG. 5 corresponds to a sample. Therefore, a total of 17 samples are used to derive a filtered value for the sample of position C8. Considering overhead of transmitting the coefficients, a point-symmetrical filter is utilized with only nine coefficients left, {C0, C1, . . . , C8}, which reduces the number of filter coefficients to half as well as the number of multiplications in filtering. The point-symmetrical filter can also reduce half of the computation for one filtered sample, e.g., only 9 multiplications and 14 add operations for one filtered sample.

5.2 Region-Based Adaptive Merge

Figure 6:
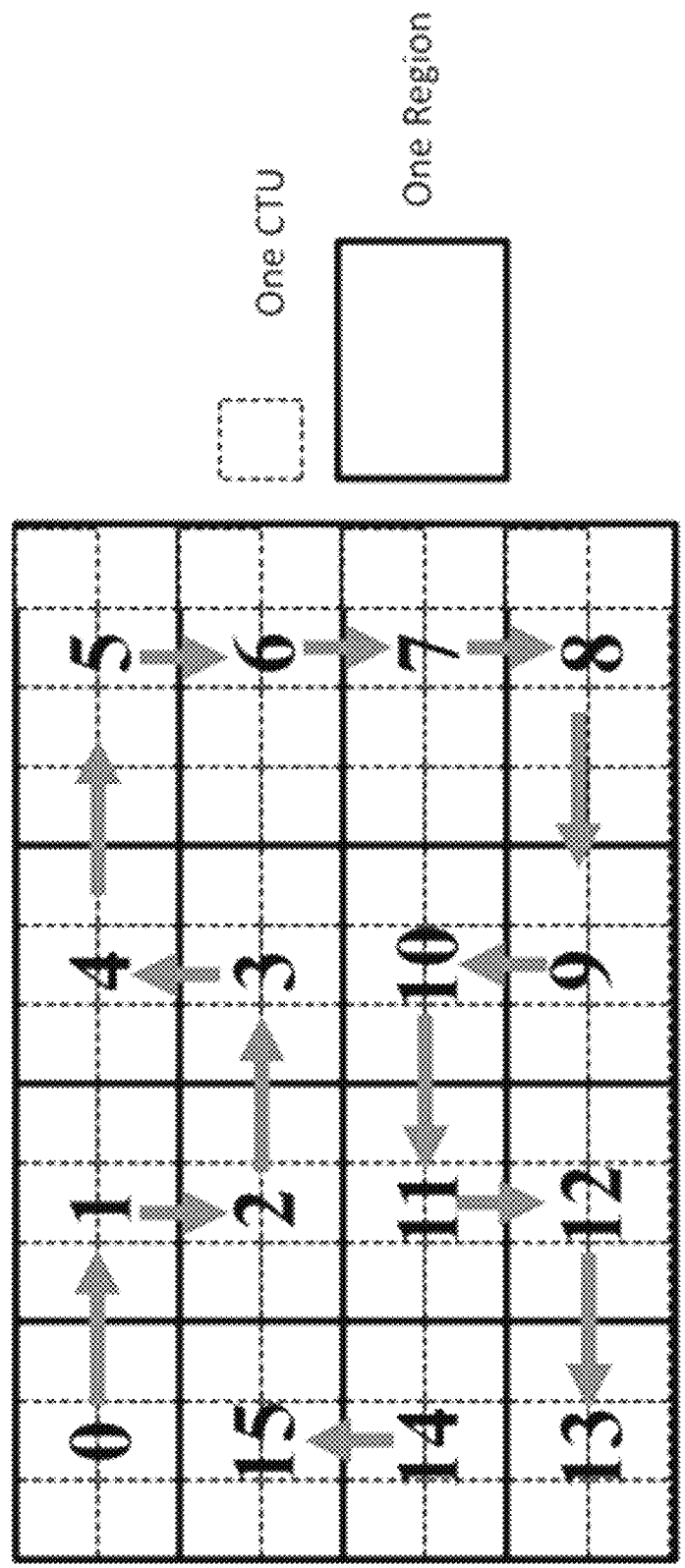
FIG. 6 shows an example of region division of a Wide Video Graphic Array (WVGA) sequence.

In order to adapt different coding errors, some embodiments adopt region-based multiple adaptive loop filters for luminance component. The luminance component is divided into 16 roughly-equal-size basic regions where each basic region is aligned with largest coding unit (LCU) boundaries as shown in FIG. 6, and one Wiener filter is derived for each region. The more filters are used, the more distortions are reduced, but the bits used to encode these coefficients increase along with the number of filters. In order to achieve the best rate-distortion performance, these regions can be merged into fewer larger regions, which share the same filter coefficients. In order to simplify the merging process, each region is assigned with an index according to a modified Hilbert order based on the image prior correlations. Two regions with successive indices can be merged based on rate-distortion cost.

The mapping information between regions should be signaled to the decoder. In AVS-2, the number of basic regions is used to represent the merge results and the filter coefficients are compressed sequentially according to its region order. For example, when {0, 1}, {2, 3, 4}, {5, 6, 7, 8, 9} and the left basic regions merged into one region respectively, only three integers are coded to represent this merge map, i.e., 2, 3, 5.

5.3 Signaling of Side Information

Multiple switch flags are also used. The sequence switch flag, adaptive_loop_filter_enable, is used to control whether adaptive loop filter is applied for the whole sequence. The image switch flags, picture_alf_enble[i], control whether ALF is applied for the corresponding ith image component. Only if the picture_alf_enble[i] is enabled, the corresponding LCU-level flags and filter coefficients for that color component will be transmitted. The LCU level flags, lcu_alf_enable[k], control whether ALF is enabled for the corresponding kth LCU, and are interleaved into the slice data. The decision of different level regulated flags is all based on the rate-distortion cost. The high flexibility further makes the ALF improve the coding efficiency much more significantly.

In some embodiments, and for a luma component, there could be up to 16 sets of filter coefficients.

In some embodiments, and for each chroma component (Cb and Cr), one set of filter coefficients may be transmitted.

6 Example GALF

In some embodiments, the filtering process of the Adaptive Loop Filter, is performed as follows:

$$O(x,y)=\Sigma_{(i,j)}w(i,j)\cdot I(x+i,y+j) \qquad (11)$$

where samples I(x+i,y+j) are input samples, O(x,y) is the filtered output sample (i.e. filter result), and w(i,j) denotes the filter coefficients. In some embodiments, it is implemented using integer arithmetic for fixed point precision computations:

$$O(x,y) = \left( \sum_{i=-\frac{L}{2}}^{\frac{L}{2}} \sum_{j=-\frac{L}{2}}^{\frac{L}{2}} w(i,j) \cdot I(x+i, y+j) + 64 \right) \gg 7 \qquad (12)$$

where L denotes the filter length, and where w(i,j) are the filter coefficients in fixed point precision.

7 Non-Linear Adaptive Loop Filtering (ALF)

7.1 Filtering Reformulation

Equation (11) can be reformulated, without coding efficiency impact, in the following expression:

$$O(x,y)=I(x,y)+\Sigma_{(i,j)\neq(0,0)}w(i,j)\cdot(I(x+i,y+j)-I(x,y)) \quad (13)$$

Herein, w(i,j) are the same filter coefficients as in equation (11) [excepted w(0,0) which is equal to 1 in equation (13) while it is equal to $1-\Sigma_{(i,j)\neq(0,0)}w(i,j)$ in equation (11)].

7.2 Modified Filter

Using this above filter formula of (13), non linearity can be introduced to make ALF more efficient by using a simple clipping function to reduce the impact of neighbor sample values (I(x+i,y+j)) when they are too different with the current sample value (I(x,y)) being filtered.

In this proposal, the ALF filter is modified as follows:

$$O'(x,y)=I(x,y)+\Sigma_{(i,j)\neq(0,0)}w(i,j)\cdot K(I(x+i,y+j)-I(x,y),k(i,j)) \quad (14)$$

Herein, K(d,b)=min(b, max(−b,d)) is the clipping function, and k(i,j) are clipping parameters, which depends on the (i,j) filter coefficient. The encoder performs the optimization to find the best k(i,j).

In some embodiments, the clipping parameters k(i,j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, the evaluation of the clipping values can be limited to a small set of possible values. Only 4 fixed values can be used which are the same for INTER and INTRA tile groups.

Because the variance of the local differences is often higher for Luma than for Chroma, two different sets for the Luma and Chroma filters can be used. The maximum sample value (here 1024 for 10 bits bit-depth) in each set can be included so that clipping can be disabled if it is not necessary.

The sets of clipping values used in some embodiments are provided in the Table 2. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ round\left( ((M)^{\frac{1}{N}})^{N-n+1} \right) \text{ for } n \in 1..N \right\},$$

with $M = 2^{10}$ and $N = 4$.

Similarly, the Chroma tables of clipping values is obtained according to the following formula:

$$AlfClip_C = \left\{ round\left( A \cdot \left(\frac{M}{A}\right)^{N-n} \right) \text{for } n \in 1..N \right\},$$

with $M = 2^{10}$, $N = 4$ and $A = 4$.

TABLE 2

Authorized clipping values

| | INTRA/INTER tile group |
|---|---|
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 2. This encoding scheme is the same as the encoding scheme for the filter index.

8 Example In-Loop Reshaping (ILR)

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT $[Y_i]$. The other LUT is an inverse LUT, InvLUT, that maps altered code values $Y_r$ to $\hat{Y}_i$: $\hat{Y}_i$=InvLUT $[Y_r]$. ($\hat{Y}_i$ represents the reconstruction values of $Y_i$).

8.1 Example Piece-Wise Linear (PWL) Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2FP\_PREC-1)>>FP\_PREC)+c$$

Herein, m is scalar, c is an offset, and FP_PREC is a constant value to specify the precision.

Note that in some embodiments, the PWL model is used to precompute the 1024-entry FwdLUT and InvLUT mapping tables; but the PWL model also allows implementations to calculate identical mapping values on-the-fly without pre-computing the LUTs.

8.2 Example Reshaping

8.2.1 Luma Reshaping

Some embodiments of the in-loop luma reshaping provide a lower complexity pipeline that also eliminates decoding latency for block-wise intra prediction in inter slice reconstruction. Intra prediction is performed in reshaped domain for both inter and intra slices.

Figure 7:
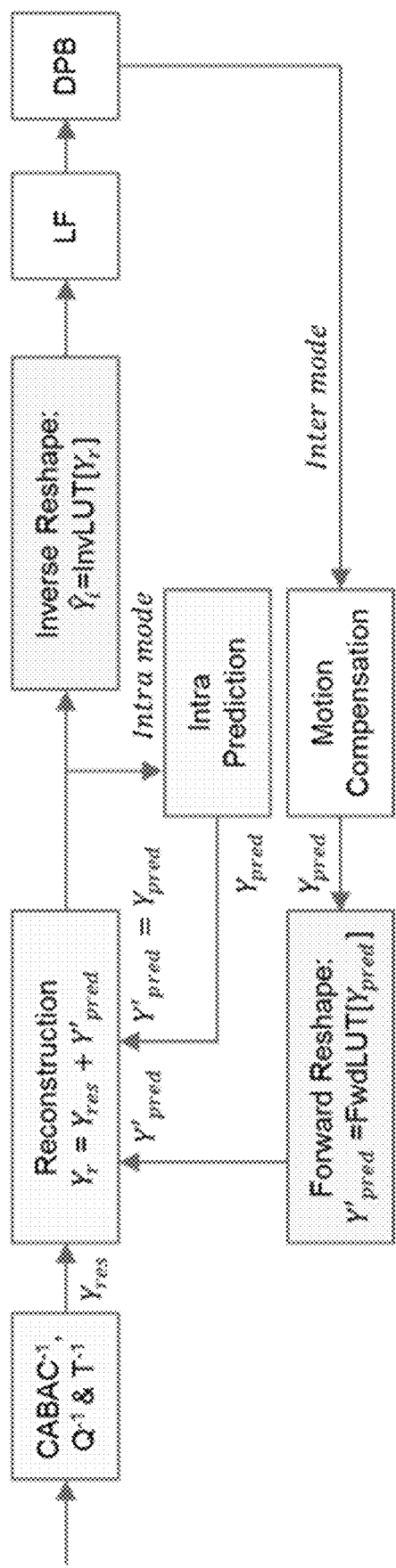
FIG. 7 shows an exemplary flowchart of decoding flow with reshaping.

Intra prediction is performed in reshaped domain regardless of slice type. With such arrangement, intra prediction can start immediately after previous TU reconstruction is done. Such arrangement can also provide a unified process for intra mode instead of being slice dependent. FIG. 7 shows the block diagram of an example decoding process based on mode.

Some embodiments also test 16-piece piece-wise linear (PWL) models for luma and chroma residue scaling instead of the 32-piece PWL models.

Inter slice reconstruction with in-loop luma reshaper in some embodiments (lighter shaded blocks indicate signal in reshaped domain: luma residue; intra luma predicted; and intra luma reconstructed)

8.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

8.2.3 Signaling of ILR Side Information

The parameters are (currently) sent in the tile group header (similar to ALF). These reportedly take 40-100 bits. The following spec is based on version 9 of JVET-L1001. The added syntax is highlighted in yellow.

In 7.3.2.1 Sequence parameter set RBSP syntax

| seq_parameter_set_rbsp( ) { | Descriptor |
|---|---|
| sps_seq_parameter_set_id | ue(v) |
| ... | |
| sps_triangle_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i =0; i < sps_num_ladf_intervals_minus2 + 1; i++) { | |
|     sps_ladf_qp_offset[ i ] | se(v) |
|     sps_ladf_delta_threshold_minus1[ i ] | ue(v) |
|   } | |
| } | |
| sps_reshaper_enabled_flag | u(1) |
| rbsp_trailing_bits( ) | |
| } | |

In 7.3.3.1 General tile group header syntax

| tile_group_header( ) { | Descriptor |
|---|---|
| ... | |
|   if( num_tiles_in_tile_group_minus1 > 0) { | |
|     offset_len_minus1 | ue(v) |
|     for( i = 0; i <num_tiles_in_tile_group_minus1; i++) | |
|       entry_point_offset_minus1[ i ] | u(v) |
|   } | |
|   if ( sps_reshaper_enabled_flag ) { | |
|     tile_group_reshaper_model_present_flag | u(1) |
|     if ( tile_group_reshaper_model_present_flag ) | |
|       tile_group_reshaper_model ( ) | |
|     tile_group_reshaper_enable_flag | u(1) |
|     if ( tile_group_reshaper_enable_flag && (!( qtba_dual_tree_intra_flag && tile_group_type == I ) ) ) | |
|       tile_group_reshaper_chr oma_residual_scale_flag | u(1) |
|   } | |
|   byte_alignment( ) | |
| } | |

Add a new syntax table tile group reshaper model:

| tile_group_reshaper_model ( ) { | Descriptor |
|---|---|
| reshaper_model_min_bin_idx | ue(v) |
| reshaper_model_delta_max_bin_idx | ue(v) |
| reshaper_model_bin_delta_abs_cw_prec_minus1 | ue(v) |
| for ( i = reshaper_model_min_bin_idx; i <= reshaper_model_max_bin_idx; i++) { | |
|   reshape_model_bin_delta_abs_CW [ i ] | u(v) |
|   if ( reshaper_model_bin_delta_abs_CW[ i ] ) > 0) | |
|     reshaper_model_bin_delta_sign_CW_flag[ i ] | u(1) |
| } | |
| } | |

In General sequence parameter set RBSP semantics, add the following semantics:
sps_reshaper_enabled_flag equal to 1 specifies that reshaper is used in the coded video sequence (CVS). sps_reshaper_enabled_flag equal to 0 specifies that reshaper is not used in the CVS.
In tile group header syntax, add the following semantics
tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not

[i])*reshape_model_bin_delta_abs_CW [i];
The variable RspCW[i] is derived as following steps:
The variable OrgCW is set equal to (1<<BitDepthγ)/(MaxBinIdx+1).
  If reshaper_model_min_bin_idx<=i<=reshaper_model_max_bin_idx RspCW[i]=OrgCW+RspDeltaCW[i].
  Otherwise, RspCW[i]=0.
The value of RspCW [i] shall be in the range of 32 to 2*OrgCW-1 if the value of BitDepthγ is equal to 10.
The variables InputPivot[i] with i in the range of 0 to MaxBinIdx+1, inclusive are derived as follows InputPivot[i]=i*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
   ReshapePivot[ i + 1 ] = ReshapePivot[ i ] + RspCW[ i ]
   ScaleCoef[ i ] = ( RspCW[ i ] * (1 << shiftY) + (1 << (Log2(OrgCW) − 1))) >> (Log2(OrgCW))
   if ( RspCW[ i ] == 0 )
     InvScaleCoeff[ i ] = 0
   else
     InvScaleCoeff[ i ] = OrgCW * (1 << shiftY) / RspCW[ i ]
}
``` enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.
Add tile_group_reshaper_model( ) syntax
reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.
reshaper_model_bin_delta_abs_cw_prec_minus1 plus 1 specifies the number of bits used for the representation of the syntax reshape_model_bin_delta_abs_CW[i].
reshape_model_bin_delta_abs_CW[i] specifies the absolute delta codeword value for the ith bin.
reshaper_model_bin_delta_sign_CW_flag[i] specifies the sign of reshape_model_bin_delta_abs_CW[i] as follows:
  If reshape_model_bin_delta_sign_CW_flag[i] is equal to 0, the corresponding variable RspDeltaCW[i] is a positive value.
  Otherwise (reshape_model_bin_delta_sign_CW_flag[i] is not equal to 0), the corresponding variable RspDeltaCW[i] is a negative value.
When reshape_model_bin_delta_sign_CW_flag[i] is not present, it is inferred to be equal to 0.
The variable RspDeltaCW [i]=(1 2*reshape_model_bin_delta_sign_CW The variable ChromaScaleCoef[i] with i in the range of 0 to MaxBinIdx, inclusive, are derived as follows:
  ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};
  shiftC=11
    if (RspCW[i]==0)
      ChromaScaleCoef[i]=(1<<shiftC)
    Otherwise (RspCW[i]!=0), ChromaScaleCoef[i]= ChromaResidualScaleLut[RspCW[i]>>1]

8.2.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual is generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
  Current block is intra-coded
  Current block is coded as CPR (current picture referencing, aka intra block copy, IBC)
  Current block is coded as combined inter-intra mode (CIIP) and the forward reshaping is disabled for the intra prediction block

9 Bi-Directional Optical Flow (BIO or BDOF)
9.1 Overview and Analysis of BIO In BDOF (aka BIO), motion compensation is first performed to generate the first predictions (in each prediction direction) of the current block. The first predictions are used to derive the spatial gradient, the temporal gradient and the optical flow of each sub-block or pixel within the block, which are then used to generate the second prediction, e.g., the final prediction of the sub-block or pixel. The details are described as follows.

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k(k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (15)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad \text{Eq. (16)}$$

Figure 8:
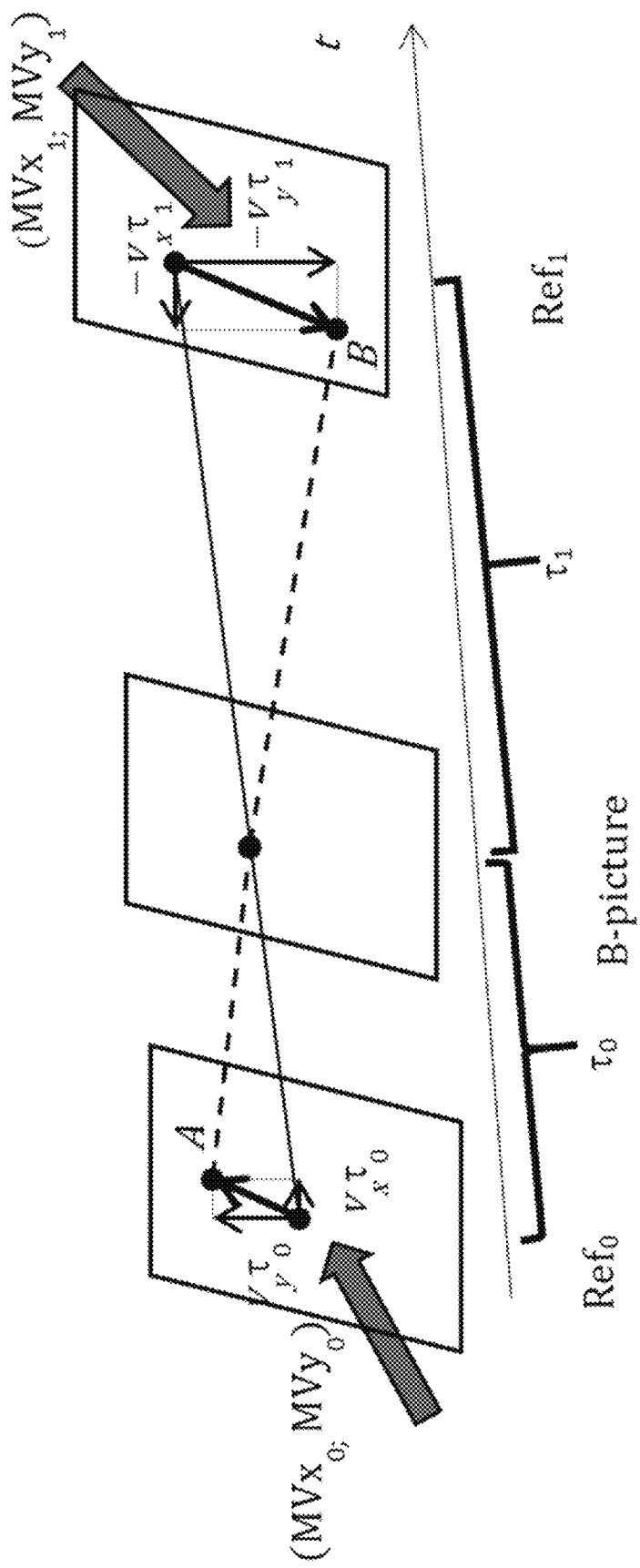
FIG. 8 shows an example of an optical flow trajectory used by the bi-directional optical flow (BDOF or BIO) algorithm.

FIG. 8 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC(Ref}_0)$, $\tau_1 = \text{POC(Ref}_1) - \text{POC(current)}$. If both predictions come from the same time direction (either both from the past or both from the future) then the signs are different (e.g., $\tau_0 \tau_0 < 0$). In this case, BIO is applied if the prediction is not from the same time moment (e.g., $\tau_0 \neq \tau_1$). Both referenced regions have non-zero motion (e.g. $MVx_0, MVy_0, MVx_1, MVy_1 \neq 0$) and the block motion vectors are proportional to the time distance (e.g. $MVx_0/mVx_1 = mVy_0/mVy_1 = -\tau_0/\tau_1$).

The motion vector field $(v_x, v_y)$ is determined by minimizing the difference $\Delta$ between values in points A and B. FIG. 8 shows an example of intersection of motion trajectory and reference frame planes. Model uses only first linear term of a local Taylor expansion for $\Delta$:

$$\Delta = (I^{(0)} - I^{(1)}_0 + v_x(\tau_1 \partial I^{(1)}/\partial x + \tau_0 \partial I^{(0)}/\partial x) + v_y (\tau_1 \partial I^{(1)}/\partial y + \partial^{(0)} \partial I^{(0)}/\partial y)) \qquad \text{Eq. (17)}$$

All values in the above equation depend on the sample location, denoted as (i',j'). Assuming the motion is consistent in the local surrounding area, $\Delta$ can be minimized inside the (2M+1)×(2M+1) square window $\Omega$ centered on the currently predicted point (i,j), where M is equal to 2:

$$(v_x, v_y) = \operatorname*{argmin}_{v_x, v_y} \sum_{[i',j'] \in \Omega} \Delta^2[i', j'] \qquad \text{Eq. (18)}$$

For this optimization problem, the JEM uses a simplified approach making first a minimization in the vertical direction and then in the horizontal direction. This results in the following:

$$v_x = (s_1 + r) > m ? \text{clip3}\left(-thBIO, thBIO, -\frac{s_3}{(s_1 + r)}\right) : 0 \qquad \text{Eq. (19)}$$

$$v_y = (s_5 + r) > m ? \text{clip3}\left(-thBIO, thBIO, -\frac{s_6 - v_x s_2/2}{(s_5 + r)}\right) : 0 \qquad \text{Eq. (20)}$$

where, $$s_1 = \sum_{[i',j'] \in \Omega} (\tau_1 \partial I^{(1)}/\partial x + \tau_0 \partial I^{(0)}/\partial x)^2;$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y); \qquad \text{Eq. (21)}$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (19) and Eq. (20), where:

$$r = 500 \cdot 4^{d-8} \qquad \text{Eq. (22)}$$

$$m = 700 \cdot 4^{d-8} \qquad \text{Eq. (23)}$$

Here, d is bit depth of the video samples.

Figures 9A, 9B:
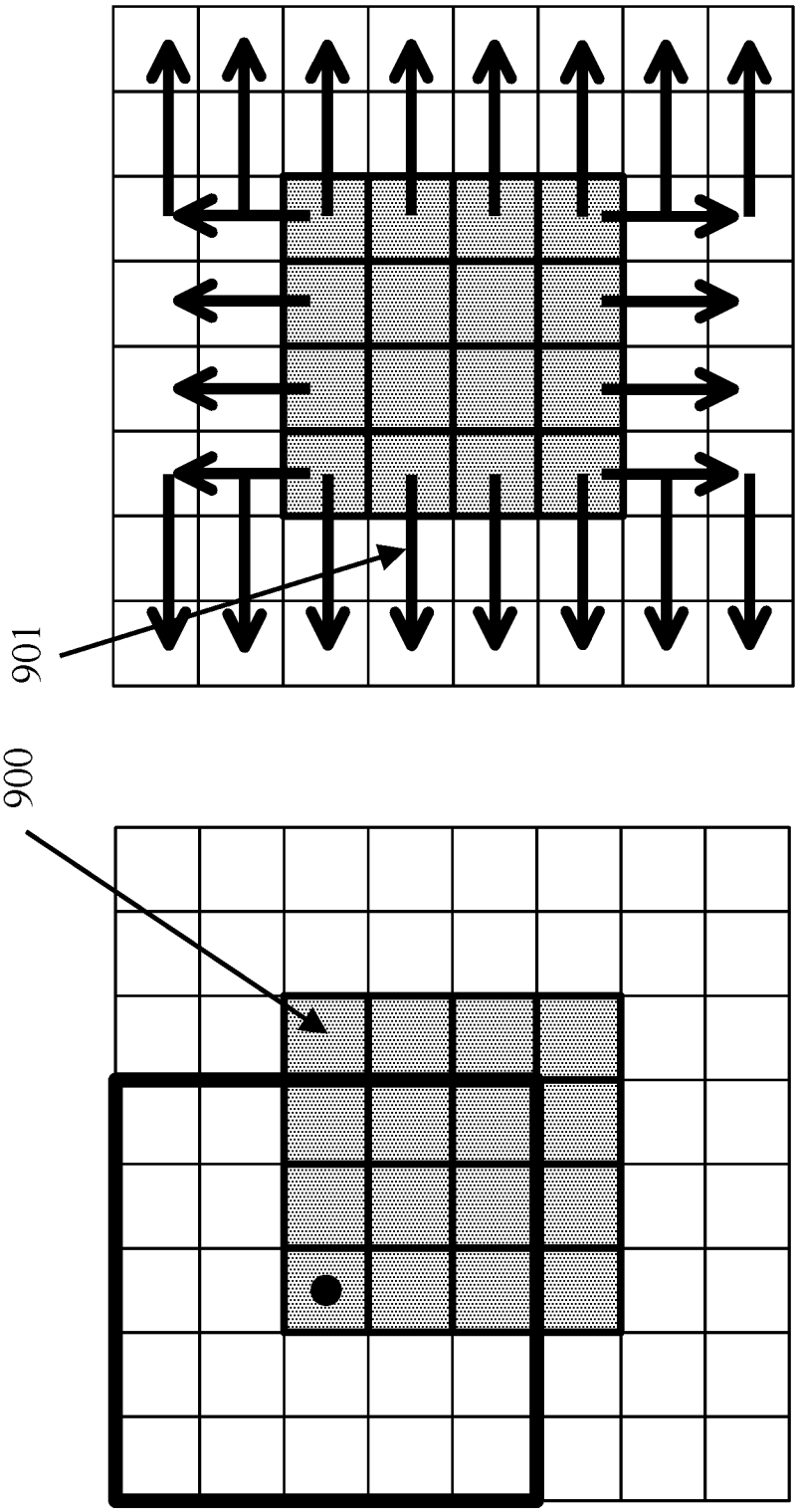
FIGS. 9A and 9B show example snapshots of using of the bi-directional optical flow (BIO) algorithm without block extensions.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 9A shows an example of access positions outside of a block 900. As shown in FIG. 9A, in Eq. (17), (2M+1)×(2M+1) square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 901, as shown in FIG. 9B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (21) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y) \in b_k} \sum_{[i',j'] \in \Omega} (\tau_1 \partial I^{(1)}/\partial x + \tau_0 \partial I^{(0)}/\partial x)^2; \qquad \text{Eq. (24)}$$

$$s_{3,b_k} = \sum_{(x,y) \in b_k} \sum_{[i',j'] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j'] \in \Omega} (\tau_1 \partial I^{(1)}/\partial x + \tau_0 \partial I^{(0)}/\partial x)$$

$$(\tau_1 \partial I^{(1)}/\phi + \tau_0 \partial I^{(0)}/\partial y);$$

$$s_{5,b_k} = \sum_{(x,y) \in b_k} \sum_{[i',j'] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j'] \in \Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (19) and Eq (20) are replaced by $((s_{n,bk})>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient ∂I/∂x, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient ∂I/∂y, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 3 shows example filters that can be used for gradients calculation of different fractional positions of block motion vector in BIO. Table 4 shows example interpolation filters that can be used for prediction signal generation in BIO.

TABLE 3

Exemplary filters for gradient calculations in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 4

Exemplary interpolation filters for prediction signal generation in BIO

| Fractional pel position | Interpolation filter for prediction signal(BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

10 Example Prediction Refinement with Optical Flow (PROF)

In some embodiments can refine the sub-block based affine motion compensated prediction with optical flow. After the sub-block based affine motion compensation is performed, prediction sample is refined by adding a difference derived by the optical flow equation, which is referred as prediction refinement with optical flow (PROF). Such techniques can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The PROF is described as following four steps.

Step 1) The sub-block-based affine motion compensation is performed to generate sub-block prediction I(i,j).

Step 2) The spatial gradients $g_x(i,j)$ and $g_y(i,j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement is calculated by the optical flow equation.

$$\Delta I(i,j)=g_x(i,j)*\Delta v_x(i,j)+g_y(i,j)*\Delta v_y(i,j)$$

Figure 10:
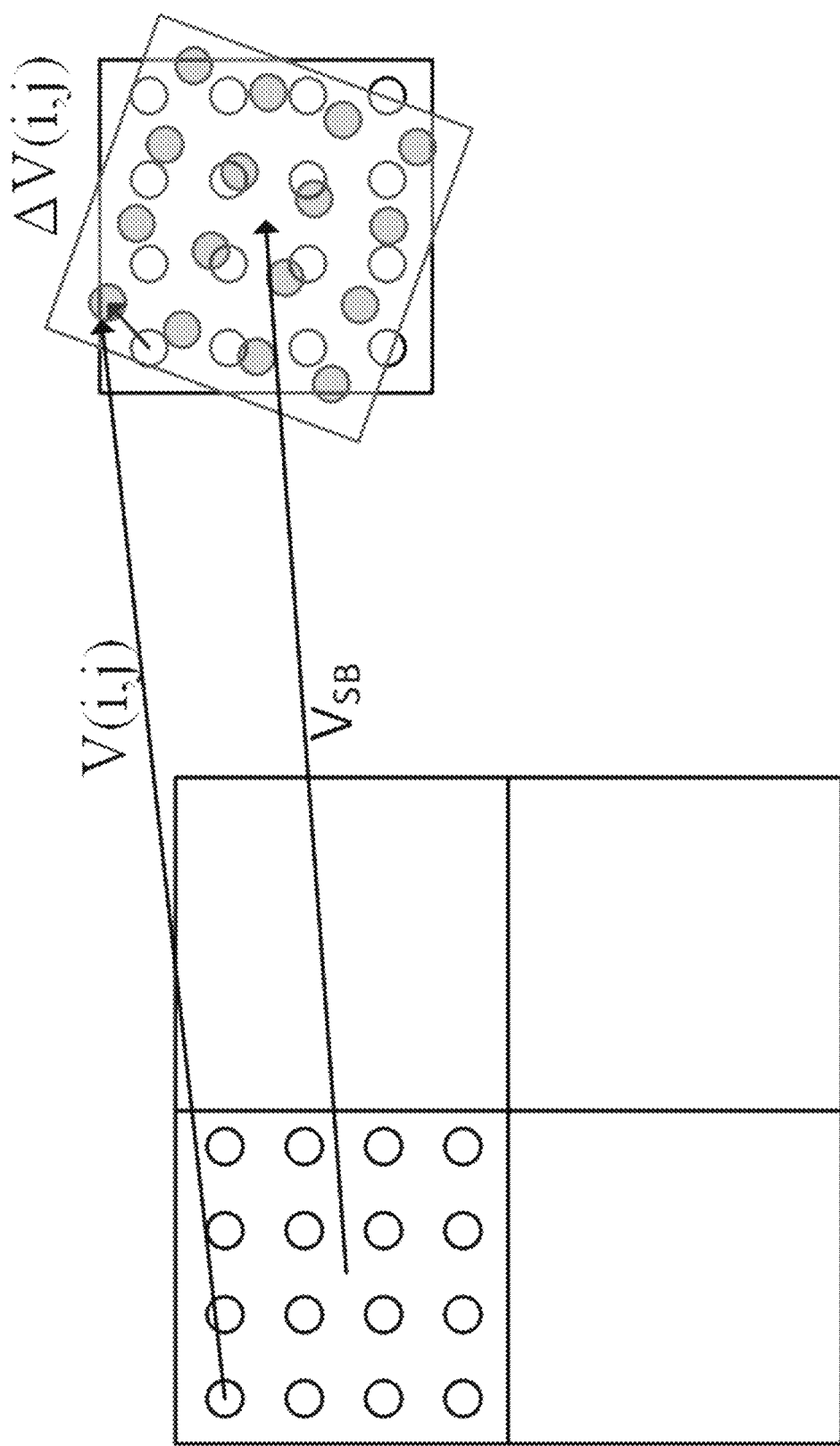
FIG. 10 shows an example of prediction refinement with optical flow (PROF).

Herein, Δv(i,j) is the difference between pixel MV computed for sample location (i,j), denoted by v(i,j), and the sub-block MV of the sub-block to which pixel (i,j) belongs, as shown in FIG. 10.

Since the affine model parameters and the pixel location relative to the sub-block center are not changed from sub-block to sub-block, Δv(i,j) can be calculated for the first sub-block, and reused for other sub-blocks in the same CU. Let x and y be the horizontal and vertical offset from the pixel location to the center of the sub-block, Δv(x,y) can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

Herein, $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as the following equation:

$$I'(i,j) = I(i,j) + \Delta I(i,j)$$

11 Drawbacks of Existing Implementations

The non-linear ALF (NLALF), BIO (aka BDOF) and/or PROF designs have the following problems:

(1) For either BDOF or PROF, the derived offset values which applied to the prediction samples may be too far away from the original samples, thereby resulting in a larger residual.

(2) 2-D filtering is applied which may be suboptimal for sequences with strong horizontal or vertical patterns.

12 Exemplary Methods for Sample Refinement and Filtering in Video Coding

Embodiments of the presently disclosed technology overcome the drawbacks of existing implementations, thereby providing video coding with higher coding efficiencies. The sample refinement and filtering methods for video coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

It is noted that 'filtering methods' mentioned in the examples below may refer to the adaptive loop filter/post-reconstruction filters (such as bilateral filter, diffusion filter etc.).

1. Instead of clipping the difference between each neighboring pixel and the current pixel, clipping may be applied to the weighted average of neighboring pixels.
   a. In some embodiments, clipping may be done as follows, wherein K is clipping operation.

$$O(x,y) = I(x,y) + K(\Sigma_{(i,j) \neq (0,0)} w(i,j) \cdot (I(x+i, y+j) - I(x,y)))$$

2. 1-D filtering method may be utilized.
   a. In some embodiments, the 1-D filter may only use horizontally neighboring samples.
      i. In some embodiments, the filtering process may be represented in the following way:

$$O(x, y) = \sum_{(i,j)} w(i, j) * \sum_{si=-T}^{T} ws(k) * I(x + i + si, y + j)$$

ii. The number of samples/filter tap (e.g., T) may be different for different pixels. For example, for a pixel at CTU boundary, pixels that are not within the current CTU is not used.
   b. In some embodiments, the short tap filter may only use vertically neighboring samples.

$$O(x, y) = \sum_{(i,j)} w(i, j) * \sum_{si=-T}^{T} ws(k) * I(x + i, y + j + si)$$

i. T may be different for different pixels. For example, for a pixel at CTU boundary, pixels that are not within the current CTU is not used.
   c. In some embodiments, the 1-D tap filter may only use neighboring samples along one direction excluding horizontal/vertical directions.
   d. In some embodiments, ws(si) may be different for different classes of pixels.
   e. In some embodiments, ws(si) may be the same for different classes of pixels.
   f. In some embodiments, ws(si) may be signaled to the decoder.
   g. In some embodiments, ws(si) may be predefined.
3. 1-D non-linear adaptive loop filtering method may be utilized.
   a. In some embodiments, the short tap filter may only use horizontally neighboring samples.
      i. In some embodiments, the non-linear filtering method may be represented in the following way with horizontal neighboring samples:

$$O'(x, y) = I(x, y) +$$
$$\sum_{(i,j) \neq (0,0)} w(i, j) \cdot K\left( \sum_{si=-T}^{T} ws(si) * I(x + i + si, y + j) - I(x, y), k(i, j) \right)$$

ii. T may be different for different pixels. For example, for a pixel at CTU boundary, pixels that are not within the current CTU is not used.
   b. In some embodiments, the 1-D non-linear filter may only use vertically neighboring samples.
      i. In some embodiments, the no-linear filtering method may be represented in the following way with vertical neighboring samples:

$$O'(x, y) = I(x, y) +$$
$$\sum_{(i,j) \neq (0,0)} w(i, j) \cdot K\left( \sum_{si=-T}^{T} ws(si) * I(x + i, y + j + si) - I(x, y), k(i, j) \right)$$

ii. T may be different for different pixels. For example, for a pixel at CTU boundary, pixels that are not within the current CTU is not used.
c. In some embodiments, the 1-D non-linear tap filter may only use neighboring samples along one direction excluding horizontal/vertical directions.
d. In some embodiments, ws(si) may be different for different classes of pixels.
e. In some embodiments, ws(si) may be the same for different classes of pixels.
f. In some embodiments, ws(si) may be signaled to the decoder.
g. In some embodiments, ws(si) may be predefined.
4. In bilateral filter or Hadamard filter, pixels may be filtered along different directions.
a. In some embodiments, pixels may be filtered along different directions depending on the gradient information.
b. In some embodiments, for each M×N subblock, horizontal gradient and vertical gradient may be calculated, and if sum of absolute horizontal gradient is larger than or/and equal to sum of absolute vertical gradient, pixels within the subblock may be filtered horizontally.
i. Alternatively, pixels within the subblock may be filtered vertically.
c. In some embodiments, for each M×N subblock, horizontal gradient and vertical gradient may be calculated, and if sum of absolute horizontal gradient is smaller than or/and equal to sum of absolute vertical gradient, pixels within the subblock may be filtered vertically.
i. Alternatively, pixels within the subblock may be filtered horizontally.
d. In some embodiments, for each M×N subblock, horizontal gradient, vertical gradient, 45-degree diagonal gradient and 135-degree diagonal gradient may be calculated, pixels within the subblock may be filtered along the direction with largest sum of absolute gradient.
e. In some embodiments, for each M×N subblock, horizontal gradient, vertical gradient, 45-degree diagonal gradient and 135-degree diagonal gradient may be calculated, pixels within the subblock may be filtered along the direction with smallest sum of absolute gradient.
5. In BODF, gradient may be modified before being used for sample refinement or/and MV offset derivation.
a. In some embodiments, spatial or/and temporal gradients calculated in BDOF may be clipped to a range [min, max].
i. The variables min and max may be different for spatial and temporal gradients.
ii. The variables min may be smaller than 0, and max may be larger than zero.
iii. The variables min and max may depend on the input bit depth of the samples.
iv. The variables min and max may depend on the interpolation filter used for generating the intermediate samples.
v. The variables min and max may be signaled.
vi. The variables min and max may be predefined.
b. In some embodiments, spatial or/and temporal gradients calculated in BDOF may be modified by a nonlinear function.
i. For example, logistic sigmoid function may be used.
c. Similarly, in PROF, gradient may be modified before being used for sample refinement or/and MV offset derivation.
6. In BODF/PROF, refined sample value or the difference (or offset) between the prediction sample and its refined sample value may be further modified before being used to derive the final reconstruction sample value.
a. In BODF/PROF, a clipping operation may be added to the difference between the prediction sample and its refined sample value.
b. In some embodiments, the difference may be clipped to a range [min, max].
i. The variables min and max may be different for spatial and temporal gradients.
ii. The variables min may be smaller than 0, and max may be larger than zero.
iii. The variables min and max may depend on the input bit depth of the samples.
iv. The variables min and max may depend on the interpolation filter used for generating the intermediate samples.
v. The variables min and max may be signaled.
vi. The variables min and max may be predefined.
c. Alternatively, furthermore, the final reconstructed value of one prediction sample may depend on the clipped difference.
d. Alternatively, furthermore, the final reconstructed value of one prediction sample may depend on the modified refined sample/modified refined difference.
7. The clipping parameters utilized in above methods may be signaled in some video coding unit level, such as sequence level, picture level, CTU level, etc. al.
a. In some embodiments, they may be signaled in SPS/VPS/PPS/tile group header/CTU rows/regions.
b. Alternatively, the parameters may be derived on-the-fly.
c. Alternatively, the parameters may be derived according to quantization parameters, tile group type, coded mode information, reshape parameters, etc. al.
8. Whether to apply above methods may depend on the color format.
a. The proposed method may be only applicable to one color component, such as G or luma color component.
b. Alternatively, the proposed method may be applicable to all color components in the 4:4:4 color format.

The examples described above may be incorporated in the context of the method described below, e.g., methods 1100 and 1150, which may be implemented at a video decoder or a video encoder.

Figure 11A:
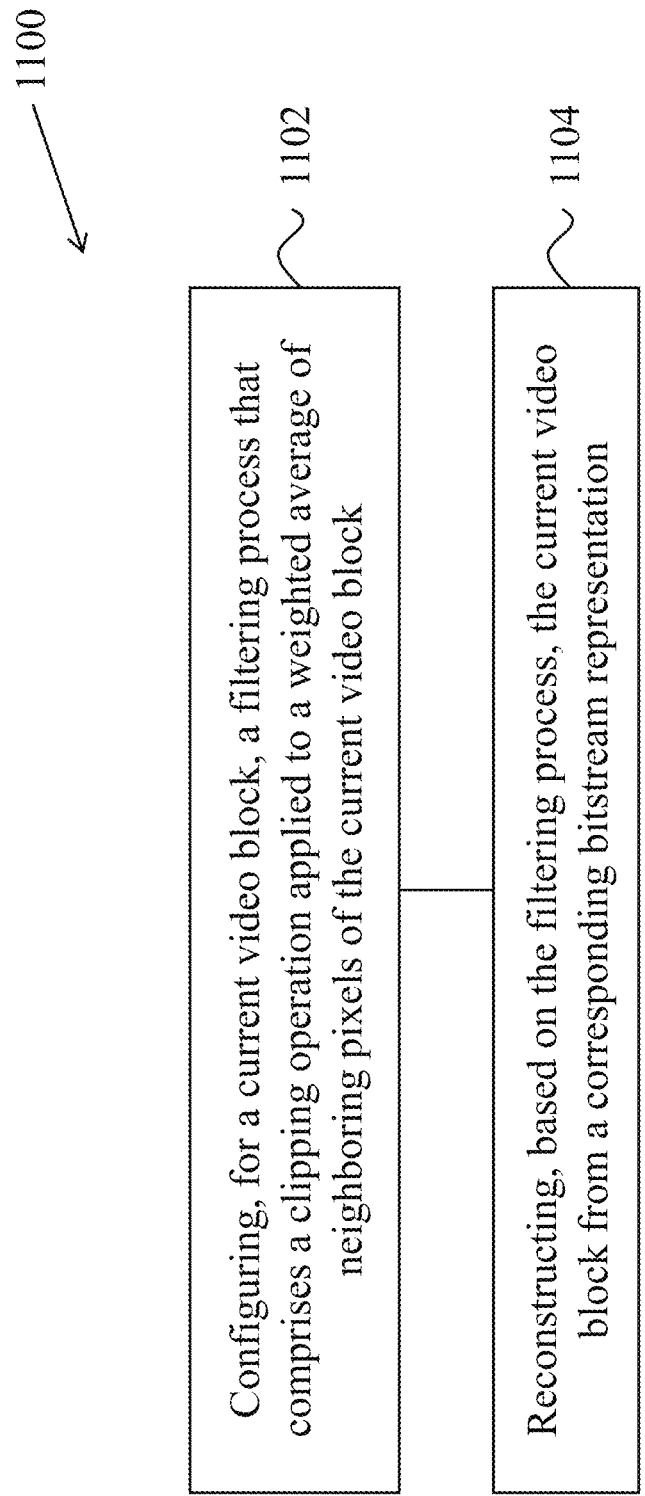
FIGS. 11A and 11B show flowcharts of example methods for sample refinement and filtering in video coding, in accordance with the disclosed technology.

FIG. 11A shows a flowchart of an exemplary method for video processing. The method 1100 includes, at step 1102, configuring, for a current video block, a filtering process that comprises a clipping operation applied to a weighted average of neighboring pixels of the current video block.

In some embodiments, the filtering process comprises $$O(x,y)=I(x,y)+K(\Sigma_{(i,j)\neq(0,0)}w(i,j)\cdot(I(x+i,y+j)-I(x,y))),$$

wherein $I(x,y)$ is an $(x,y)$-th pixel of the current video block, $O(x,y)$ is an output value of the $(x,y)$-th pixel, $w(i,j)$ is a weighting factor and $K(\bullet)$ is the clipping operation.

The method 1100 includes, at step 1104, reconstructing, based on the filtering process, the current video block from a corresponding bitstream representation.

In some embodiments, one or more parameters of the clipping operation are signaled in a sequence parameter set (SPS), a video parameter set (VPS), a picture parameter set (PPS), a tile group header, a coding tree unit (CTU) row or a CTU region.

In some embodiments, one or more parameters of the clipping operation are derived on-the-fly.

In some embodiments, one or more parameters of the clipping operation are derived based on one or more quantization parameters, one or more reshaping parameters, a tile group type or a coded mode of the current video block.

In some embodiments, the filtering process corresponds to an adaptive loop filtering process or a post-reconstruction filtering process. In an example, the post-reconstruction filtering process uses at least one of a bilateral filter, a Hadamard filter or a diffusion filter.

Figure 11B:
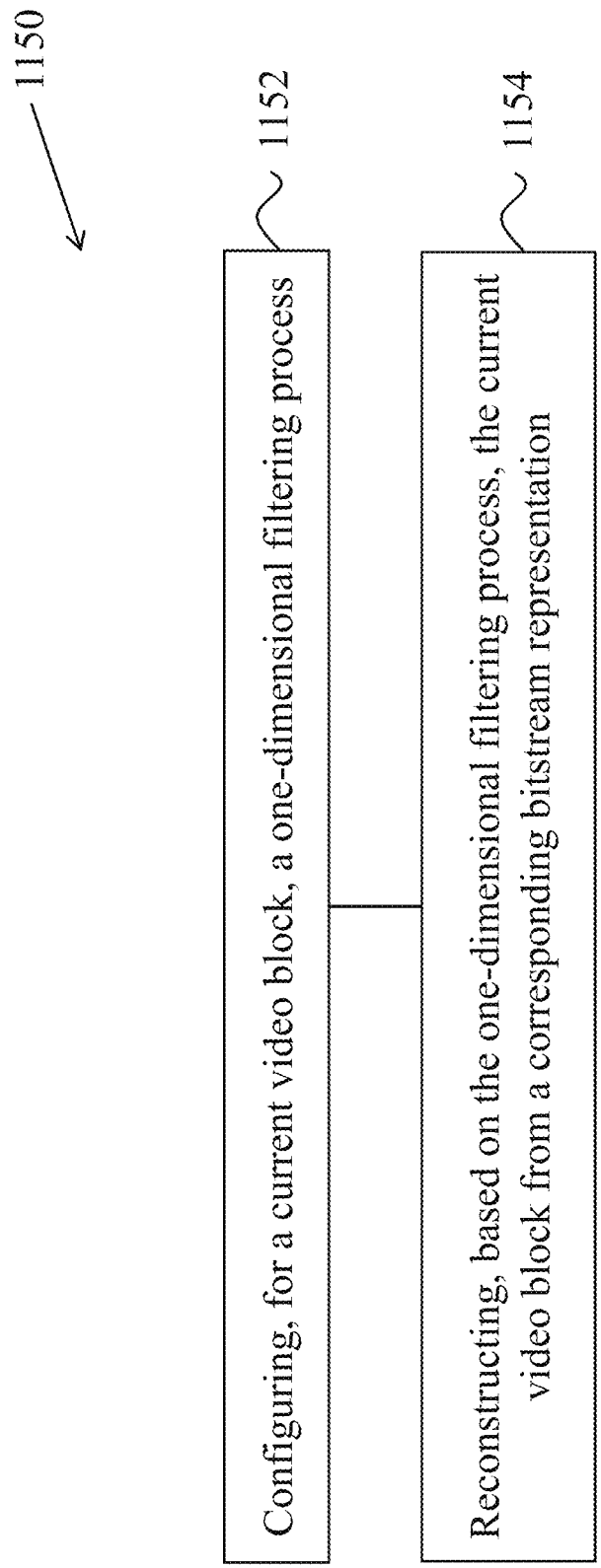

FIG. 11B shows a flowchart of an exemplary method for video processing. The method 1150 includes, at step 1152, configuring, for a current video block, a one-dimensional filtering process.

The method 1150 includes, at step 1154, reconstructing, based on the one-dimensional filtering process, the current video block from a corresponding bitstream representation.

In some embodiments, the one-dimensional filtering process is applied to at least one of horizontally neighboring samples, vertically neighboring samples, neighboring samples along a 45-degree diagonal or neighboring samples along a 135-degree diagonal of the current video block. In an example, a first set of filter taps of the one-dimensional filtering process applied to a pixel at a coding tree unit (CTU) boundary is different from a second set of filter taps of the one-dimensional filtering process applied to a pixel that is entirely within a CTU. In another example, the first set of filter taps or the second set of filter taps are predefined or are signaled in the corresponding bitstream representation.

In some embodiments, the configuring the one-dimensional filtering process is based on gradient information. In an example, the gradient information comprises a plurality of horizontal gradients and a plurality of vertical gradients for a M×N sub-block of the current video block. In another example, a sum of absolute values of the plurality of horizontal gradients is greater than or equal to a sum of absolute values of the plurality of vertical gradients. In yet another example, a sum of absolute values of the plurality of horizontal gradients is less than or equal to a sum of absolute values of the plurality of vertical gradients. In yet another example, the one-dimensional filtering process is applied to horizontally neighboring samples. In yet another example, the one-dimensional filtering process is applied to vertically neighboring samples.

In some embodiments, the gradient information further comprises a plurality of 45-degree diagonal gradients for the M×N sub-block and a plurality of 135-degree diagonal gradients for the M×N sub-block. In an example, the one-dimensional filtering process is applied along a direction corresponding to a maximum of a sum of absolute values of the plurality of horizontal gradients, vertical gradients, 45-degree diagonal gradients and 135-degree diagonal gradients. In another example, the one-dimensional filtering process is applied along a direction corresponding to a minimum of a sum of absolute values of the plurality of horizontal gradients, vertical gradients, 45-degree diagonal gradients and 135-degree diagonal gradients.

In some embodiments, the configuring the one-dimensional filtering process is based on a modification of gradient information. In an example, the modification comprises applying a clipping operation with a range [min, max] to the gradient information. In another example, min and max are configured with a first set of values for spatial gradients, and wherein min and max are configured with a second set of values different from the first set of values for temporal gradients. In yet another example, min<0 and max>0. In yet another example, values for min and max are selected based on an input bit depth of samples of the current video block. In yet another example, values for min and max are predefined or signaled in the corresponding bitstream representation.

In some embodiments, the modification comprises applying a nonlinear function to the gradient information. In an example, the nonlinear function is a logistic sigmoid function.

In some embodiments, the one-dimensional filtering process corresponds to an adaptive loop filtering process or a post-reconstruction filtering process. In an example, the post-reconstruction filtering process uses at least one of a bilateral filter, a Hadamard filter or a diffusion filter.

13 Example Implementations of the Disclosed Technology

Figure 12:
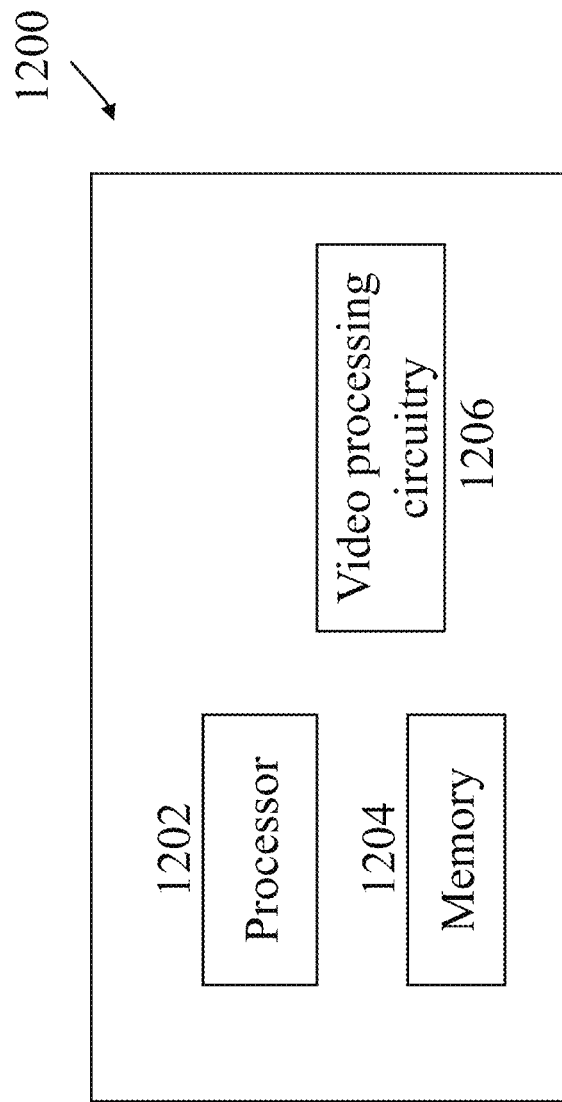
FIG. 12 is a block diagram of an example of a hardware platform for implementing a visual media decoding or a visual media encoding technique described in the present document.

FIG. 12 is a block diagram of a video processing apparatus 1200. The apparatus 1200 may be used to implement one or more of the methods described herein. The apparatus 1200 may be embodied in a smartphone, tablet, computer, Internet of Things (IoT) receiver, and so on. The apparatus 1200 may include one or more processors 1202, one or more memories 1204 and video processing hardware 1206. The processor(s) 1202 may be configured to implement one or more methods (including, but not limited to, methods 1100 and 1150) described in the present document. The memory (memories) 1204 may be used for storing data and code used for implementing the methods and techniques described herein. The video processing hardware 1206 may be used to implement, in hardware circuitry, some techniques described in the present document.

In some embodiments, the video coding methods may be implemented using an apparatus that is implemented on a hardware platform as described with respect to FIG. 12.

Figure 13:
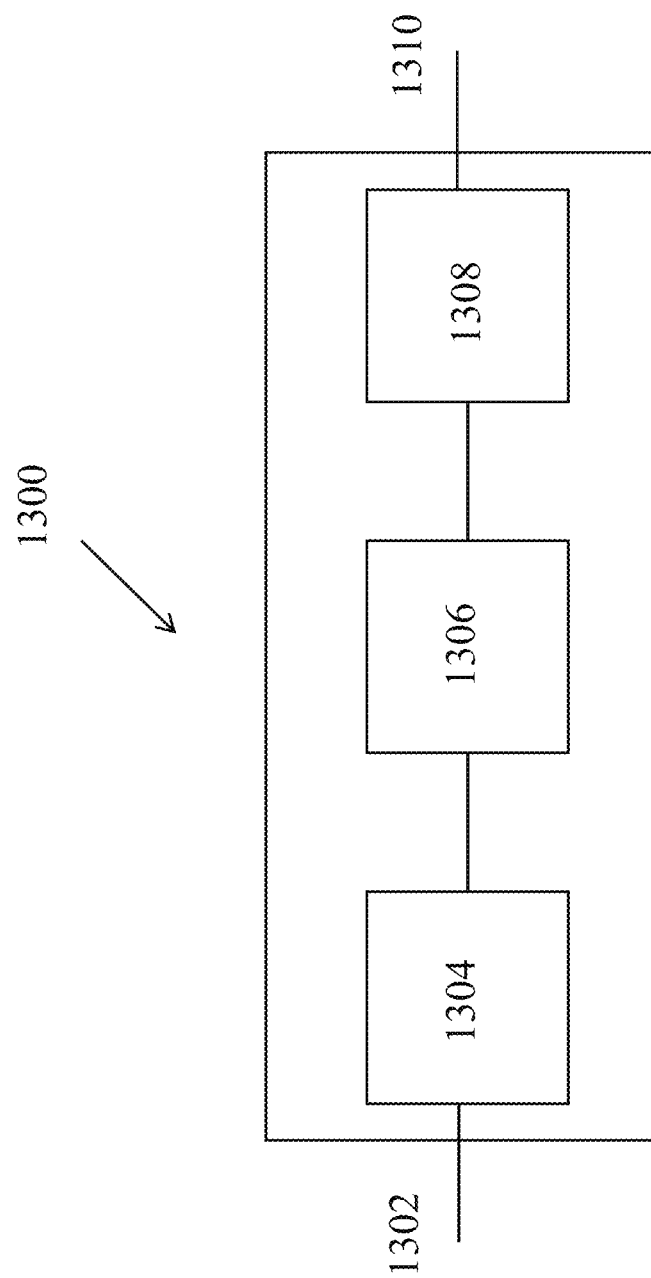
FIG. 13 is a block diagram of an example video processing system in which disclosed techniques may be implemented.

FIG. 13 is a block diagram showing an example video processing system 1300 in which various techniques disclosed herein may be implemented. Various implementations may include some or all of the components of the system 1300. The system 1300 may include input 1302 for receiving video content. The video content may be received in a raw or uncompressed format, e.g., 8 or 10 bit multi-component pixel values, or may be in a compressed or encoded format. The input 1302 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1300 may include a coding component 1304 that may implement the various coding or encoding methods described in the present document. The coding component 1304 may reduce the average bitrate of video from the input 1302 to the output of the coding component 1304 to produce a coded representation of the video. The coding techniques are therefore sometimes called video compression or video transcoding techniques. The output of the coding component 1304 may be either stored, or transmitted via a communication connected, as represented by the component 1306. The stored or communicated bitstream (or coded) representation of the video received at the input 1302 may be used by the component 1308 for generating pixel values or displayable video that is sent to a display interface 1310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 14:
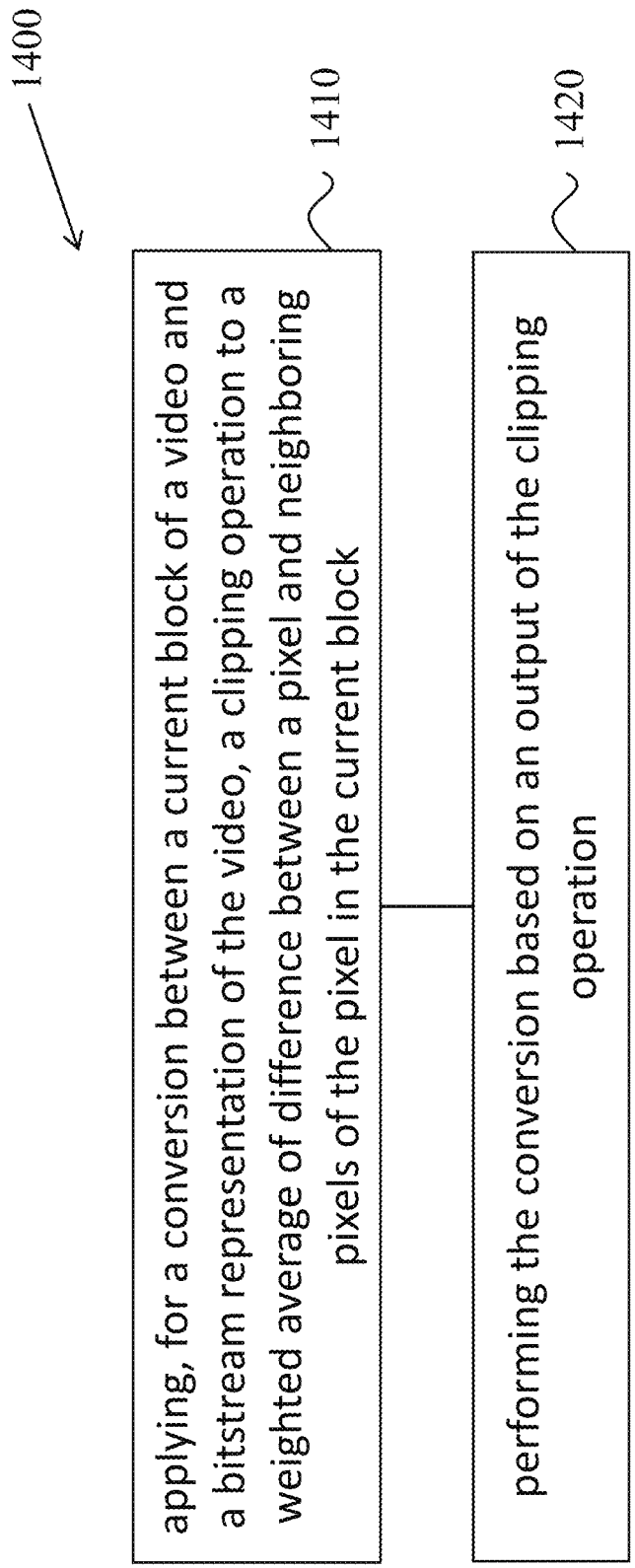
FIG. 14 is a flowchart representation of a method for video processing in accordance with the present technology.

FIG. 14 is a flowchart representation of a method 1400 for video processing in accordance with the present technology. The method 1400 includes, at operation 1410, applying, for a conversion between a current block of a video and a bitstream representation of the video, a clipping operation to a weighted average of differences between a pixel and neighboring pixels of the pixel in the current block. The method 1400 includes, at operation 1420, performing the conversion based on an output of the clipping operation.

In some embodiments, the clipping operation is applied as: $O(x,y)=I(x,y)+K(\Sigma_{(i,j)\neq(0,0)}w(i,j)\cdot(I(x+i,y+j)-I(x,y)))$, wherein $I(x,y)$ is an $(x,y)$-th pixel of the current block, $O(x,y)$ is an output value of the $(x,y)$-th pixel, $w(i,j)$ is a weighting factor and $K(\bullet)$ is the clipping operation. In some embodiments, one or more parameters of the clipping operation are signaled in a sequence parameter set (SPS), a video parameter set (VPS), a picture parameter set (PPS), a tile group header, a coding tree unit (CTU) row or a CTU region. In some embodiments, one or more parameters of the clipping operation are derived on-the-fly. In some embodiments, one or more parameters of the clipping operation are derived based on one or more quantization parameters, one or more reshaping parameters, a tile group type or a coded mode of the current video block.

Figure 15:
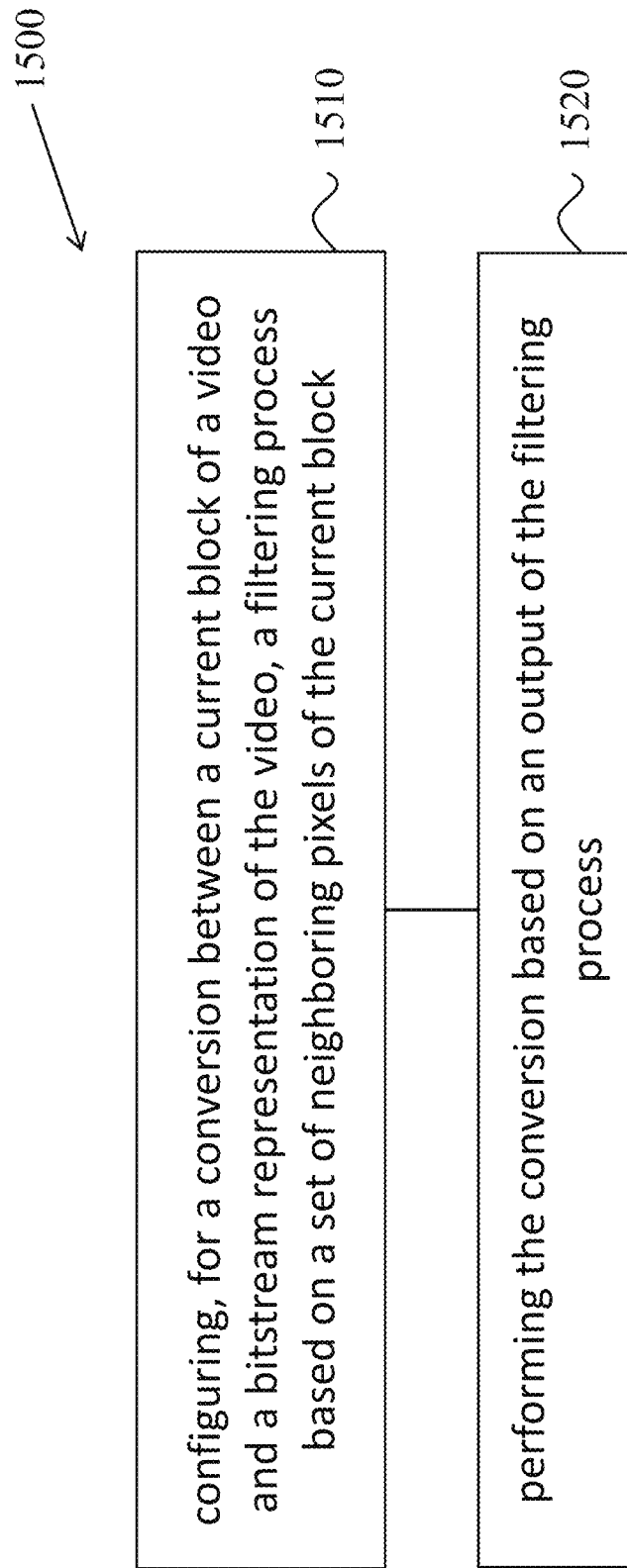
FIG. 15 is a flowchart representation of another method for video processing in accordance with the present technology.

FIG. 15 is a flowchart representation of a method 1500 for video processing in accordance with the present technology. The method 1500 includes, at operation 1510, configuring, for a conversion between a current block of a video and a bitstream representation of the video, a filtering process based on a set of neighboring pixels of the current block. The method 1500 includes, at operation 1520, performing the conversion based on an output of the filtering process.

In some embodiments, the filter processing comprises a one-dimensional filtering operation based on the set of neighboring pixels of the current block. In some embodiments, the one-dimensional filtering operation comprises a non-linear adaptive loop filtering method.

In some embodiments, the set of neighboring pixels comprises horizontal neighboring pixels of the current block. In some embodiments, the filtering process comprises $O(x,y)=\tau_{(i,j)}w(i,j)*\Sigma_{si=-T}^{T}ws(si)*I(x+i+si,y+j)$, wherein $I(x,y)$ is an $(x,y)$-th pixel of the current block, $O(x,y)$ is an output value of the $(x,y)$-th pixel, $w(i,j)$ is a weighting factor, T represents a number of pixels to be used for the filtering process, and $ws(si)$ represents filtering coefficients corresponding to T. In some embodiments, the filtering process comprises $O(x,y)=I(x,y)+\Sigma_{(i,j)\neq(0,0)}w(i,j)\cdot K(\Sigma_{si=-T}^{T}ws(si)*I(x+i+si,y+j)-I(x,y),k(i,j))$, wherein $I(x,y)$ is an $(x,y)$-th pixel of the current block, $O(x,y)$ is an output value of the $(x,y)$-th pixel, $w(i,j)$ is a weighting factor, $K(\bullet)$ is the clipping operation, T represents a number of pixels to be used for the filtering process, $ws(si)$ represents filtering coefficients corresponding to T, and $k(i,j)$ represents clipping parameters.

In some embodiments, the set of neighboring pixels comprises vertical neighboring pixels of the current block. In some embodiments, the filtering process comprises $O(x,y)=\Sigma_{(i,j)}w(i,j)*\Sigma_{si=-T}^{T}ws(si)*I(x+i,y+j+si)$, wherein $I(x,y)$ is an $(x,y)$-th pixel of the current block, $O(x,y)$ is an output value of the $(x,y)$-th pixel, $w(i,j)$ is a weighting factor, T represents a number of pixels to be used for the filtering process, and $ws(si)$ represents filtering coefficients corresponding to T. In some embodiments, the filtering process comprises $O(x,y)=I(x,y)+\Sigma_{(i,j)\neq(0,0)}w(i,j)\cdot K(\Sigma_{si=-T}^{T}ws(si)*I(x+i,y+j+si)-I(x,y),k(i,j))$, wherein $I(x,y)$ is an $(x,y)$-th pixel of the current block, $O(x,y)$ is an output value of the $(x,y)$-th pixel, $w(i,j)$ is a weighting factor, $K(\bullet)$ is the clipping operation, T represents a number of pixels to be used for the filtering process, $ws(si)$ represents filtering coefficients corresponding to T, and $k(i,j)$ represents clipping parameters.

In some embodiments, T varies for different pixels in the current block. In some embodiments, in case the $(x,y)$-th pixel of the current block is located at a boundary of the current block, the number of pixels T to be used for the filtering process excludes pixels that are located outside of the current block. In some embodiments, ws(k) is different for different pixels in the current block. In some embodiments, ws(k) is same for different pixels in the current block. In some embodiments, ws(k) is signaled in the bitstream representation. In some embodiments, ws(k) is predefined.

In some embodiments, the one-dimensional filtering operation excludes applying a filter along a horizontal or vertical direction.

In some embodiments, the filter processing comprises applying a filter along different directions. In some embodiments, the filter comprises a bilateral filter or Hadamard filter. In some embodiments, the filter is applied to the different directions based on gradient information associated with the current block. In some embodiments, the method comprises determining, for a subblock within the current block, horizontal gradients and vertical gradients of pixels in the subblock; and applying the filter to the subblock horizontally in case a sum of absolute horizontal gradients is larger than or equal to a sum of absolution vertical gradients. In some embodiments, the method comprises determining, for a subblock within the current block, horizontal gradients and vertical gradients of pixels in the subblock; and applying the filter to the subblock vertically in case a sum of absolute horizontal gradients is larger than or equal to a sum of absolution vertical gradients. In some embodiments, the method comprises determining, for a subblock within the current block, horizontal gradients and vertical gradients of pixels in the subblock; and applying the filter to the subblock horizontally in case a sum of absolute horizontal gradients is smaller than or equal to a sum of absolution vertical gradients. In some embodiments, the method comprises determining, for a subblock within the current block, horizontal gradients and vertical gradients of pixels in the subblock; and applying the filter to the subblock vertically in case a sum of absolute horizontal gradients is smaller than or equal to a sum of absolution vertical gradients. In some embodiments, the method comprises determining, for a subblock within the current block, horizontal gradients, vertical gradients, 45-degree diagonal gradients, and 135-degree diagonal gradients of pixels in the subblock; and applying the filter to the subblock along a direction with a largest sum of absolute gradient based on the determined horizontal gradients, vertical gradients, 45-degree diagonal gradients, and 135-degree diagonal gradients. In some embodiments, the method comprises determining, for a subblock within the current block, horizontal gradients, vertical gradients, 45-degree diagonal gradients, and 135-degree diagonal gradients of pixels in the subblock; and applying the filter to the subblock along a direction with a smallest sum of absolute gradient based on the determined horizontal gradients, vertical gradients, 45-degree diagonal gradients, and 135-degree diagonal gradients.

In some embodiments, whether the filtering process is applicable to the current block is based on a color format of the current block. In some embodiments, the filtering process is applicable to a single color component of the current block. In some embodiments, the single color component is a luma color component or a green component. In some embodiments, the filtering process is applicable to all color components of the current block in case the color format of the current block is a 4:4:4 color format.

Figure 16:
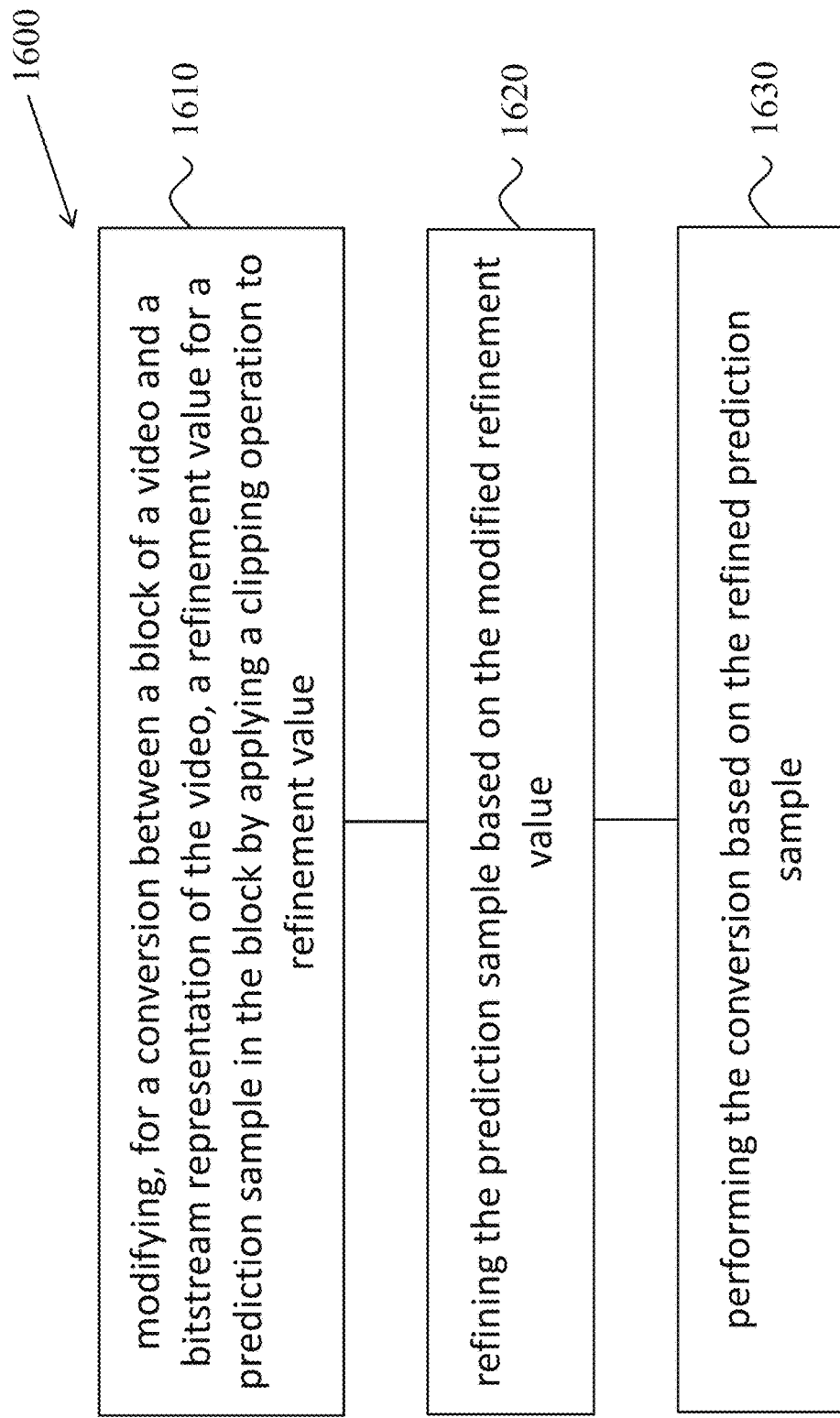
FIG. 16 is a flowchart representation of another method for video processing in accordance with the present technology.

FIG. 16 is a flowchart representation of a method 1600 for video processing in accordance with the present technology. The method 1600 includes, at operation 1610, modifying, for a conversion between a block of a video and a bitstream representation of the video, a refinement value for a prediction sample in the block by applying a clipping operation to refinement value. The refinement value is derived based on a gradient value of an optical flow coding process. An output of the clipping operation is within a range. The method 1600 includes, at operation 1620, refining the prediction sample based on the modified refinement value. The method 1600 also includes, at operation 1630, performing the conversion based on the refined prediction sample.

In some embodiments, the optical flow coding process comprises a prediction refinement with optical flow process. In some embodiments, the optical flow coding process comprises a bidirectional optical flow process.

In some embodiments, the range is determined based on an input bit depth of the sample. In some embodiments, the range that is variable based on a spatial gradient or a temporal gradient of the sample. In some embodiments, the range is [min, max], min being smaller than 0 and max being larger than 0. In some embodiments, the range is based on an interpolation filter for generating intermediate samples associated with the sample. In some embodiments, the range is signaled in the bitstream representation. In some embodiments, the range is predefined.

In some embodiments, a final reconstructed value of the sample is determined based on the output of the clipping operation. In some embodiments, a final reconstructed value of the sample is determined based on the modified prediction value for the sample. In some embodiments, the block is coded with affine motion. In some embodiments, the refinement value is derived for each of multiple samples in the block.

Figure 17:
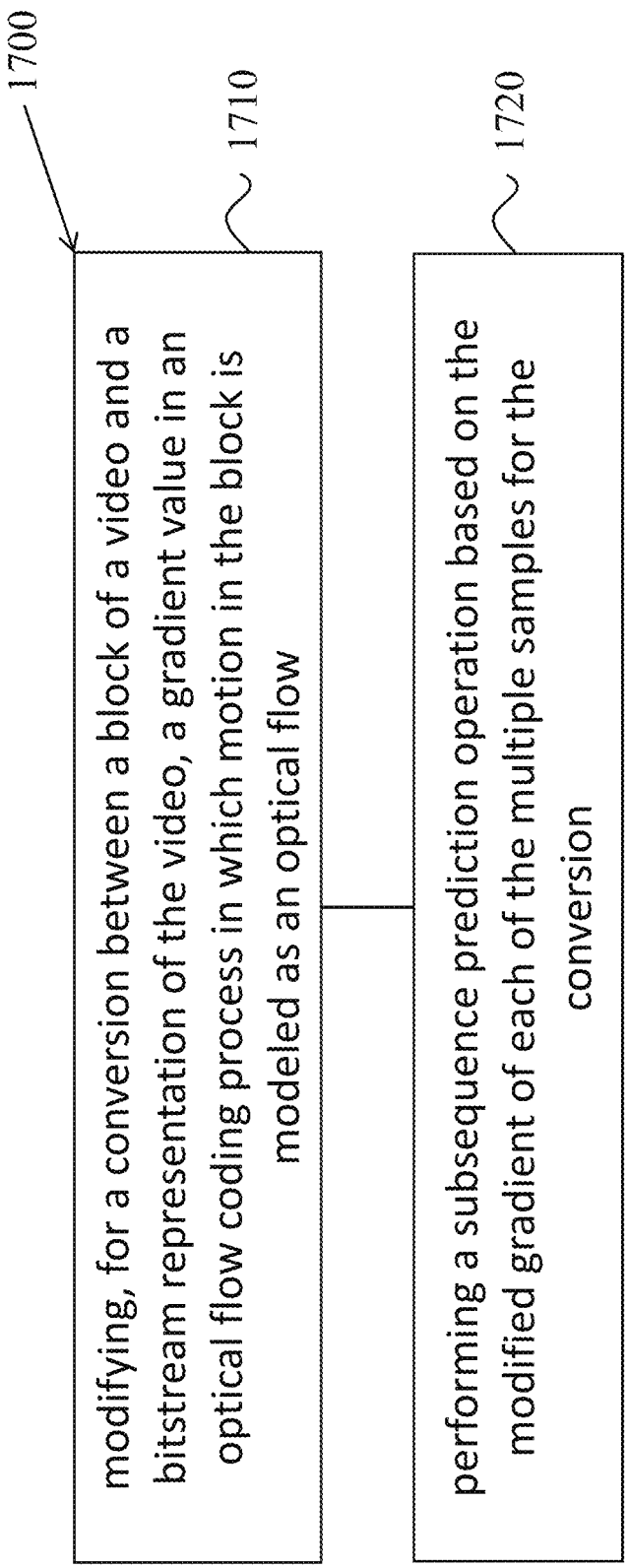
FIG. 17 is a flowchart representation of yet another method for video processing in accordance with the present technology.

FIG. 17 is a flowchart representation of a method 1700 for video processing in accordance with the present technology. The method 1700 includes, at operation 1710, modifying, for a conversion between a block of a video and a bitstream representation of the video, a gradient value in an optical flow coding process. The method 1700 also includes, at operation 1720, performing a subsequence prediction operation based on the modified gradient value for the conversion. In some embodiments, the optical flow coding process comprises a prediction refinement with optical flow process or a bidirectional optical flow process. In some embodiments, the subsequent prediction operation comprises a sample refinement operation or a motion vector offset derivation operation.

In some embodiments, modifying the gradient value comprises applying a clipping operation to the gradient value, and wherein an output of the clipping operation is within a range. In some embodiments, the range that is variable based on whether the gradient is a spatial gradient or a temporal gradient of a prediction sample. In some embodiments, the range is [min, max], min being smaller than 0 and max being larger than 0. In some embodiments, the range is determined based on an input bit depth of the sample. In some embodiments, the range is based on an interpolation filter for generating intermediate samples associated with the sample. In some embodiments, the range is signaled in the bitstream representation. In some embodiments, the range is predefined. In some embodiments, modifying the gradient value comprises applying a nonlinear function to the gradient value. In some embodiments, the nonlinear function comprises a logistic sigmoid function.

In some embodiments, the block is coded with affine motion. In some embodiments, the gradient value is derived for each of multiple samples in the block.

In some embodiments, one or more parameters of the clipping operation are signaled in a sequence parameter set (SPS), a video parameter set (VPS), a picture parameter set (PPS), a tile group header, a coding tree unit (CTU) row or a CTU region. In some embodiments, one or more parameters of the clipping operation are derived on-the-fly. In some embodiments, one or more parameters of the clipping operation are derived based on one or more quantization parameters, one or more reshaping parameters, a tile group type or a coded mode of the current video block.

In some embodiments, whether the modifying is applicable to the current block is based on a color format of the current block. In some embodiments, the modifying is applicable to a single color component of the current block. In some embodiments, the single color component is a luma color component or a green component. In some embodiments, the modifying is applicable to all color components of the current block in case the color format of the current block is a 4:4:4 color format.

In some embodiments, the optical flow coding process is a process in which motion in the block is modeled as an optical flow.

In some embodiments, performing the conversion includes generating the bitstream representation based on the current block of the video. In some embodiments, performing the conversion includes generating the current block of the video from the bitstream representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

In the present document, the term "video processing" may refer to video encoding, video decoding, video compression or video decompression. For example, video compression algorithms may be applied during conversion from pixel representation of a video to a corresponding bitstream representation (or coded representation) or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a first block of a video, a first prediction sample;
   refining the first prediction sample, based on a first optical flow refinement procedure, with a first prediction sample offset by adding the first prediction sample offset to the first prediction sample to acquire a first final prediction sample, wherein the first prediction sample offset is determined based on at least one first gradient of the first prediction sample, wherein the first gradient is calculated based on at least a difference between two prediction samples acquired based on a location of the first prediction sample, and wherein before being added to the first prediction sample to acquire the first final prediction sample, the first prediction sample offset is clipped to a first range; and
   performing a conversion between the first block and a bitstream of the video based on the first final prediction sample,
   wherein the first range is determined based on an input bit depth of the first block;
   wherein the method further comprises:
   determining, for a second block of the video, a second prediction sample;
   refining the second prediction sample, based on a second optical flow refinement procedure, with a second prediction sample offset to acquire a second final prediction sample; wherein the second prediction sample offset is determined based on at least one second gradient of the second prediction sample, wherein the second gradient is calculated based on at least a difference between two prediction samples acquired based on a location of the second prediction sample;
   clipping the second final prediction sample to a second range; and
   performing a conversion between the second block and the bitstream based on the second final prediction sample.

2. The method of claim 1, wherein the first video block is coded with an affine mode.

3. The method of claim 1, wherein the first range is [min, max], min being smaller than 0 and max being larger than 0.

4. The method of claim 1, wherein the first range is predefined.

5. The method of claim 1, wherein the second block is coded with a non-affine mode and is bi-predicated.

6. The method of claim 1, wherein the second range is determined based on an input bit depth of the second block.

7. The method of claim 1, wherein the second range is [min, max], min being smaller than 0 and max being larger than 0.

8. The method of claim 1, wherein the second range is predefined.

9. The method of claim 1, wherein the first video block is coded with an affine mode and the second video block is coded with a bi-predictive mode and a non-affine mode.

10. The method of claim 1, wherein the two prediction samples acquired based on the location of the first prediction sample are derived from a same reference picture list, and wherein the two prediction samples acquired based on the location of the second prediction sample are derived from a different reference picture list.

11. The method of claim 1, wherein performing the conversion includes decoding the first blocks from the bitstream.

12. The method of claim 1, wherein performing the conversion includes encoding the first blocks into the bitstream.

13. An apparatus for processing video data comprising a processor and a non-transitory memory with instructions thereon, wherein the instructions upon execution by the processor, cause the processor to:
   determine, for a first block of a video, a first prediction sample;
   refine the first prediction sample, based on a first optical flow refinement procedure, with a first prediction sample offset by adding the first prediction sample offset to the first prediction sample to acquire a first final prediction sample, wherein the first prediction sample offset is determined based on at least one first gradient of the first prediction sample, wherein the first gradient is calculated based on at least a difference between two prediction samples acquired based on a location of the first prediction sample, and wherein before being added to the first prediction sample to acquire the first final prediction sample, the first prediction sample offset is clipped to a first range; and
   perform a conversion between the first block and a bitstream of the video based on the first final prediction sample,
   wherein the first range is determined based on an input bit depth of the first block;
   wherein the instructions upon execution by the processor, further cause the processor to:
   determine, for a second block of the video, a second prediction sample;
   refine the second prediction sample, based on a second optical flow refinement procedure, with a second prediction sample offset to acquire a second final prediction sample; wherein the second prediction sample offset is determined based on at least one second gradient of the second prediction sample, wherein the second gradient is calculated based on at least a difference between two prediction samples acquired based on a location of the second prediction sample;
   clip the second final prediction sample to a second range; and
   perform a conversion between the second block and the bitstream based on the second final prediction sample.

14. The apparatus of claim 13, wherein the first video block is coded with an affine mode.

15. The apparatus of claim 13, wherein the second block is coded with a non-affine mode and is bi-predicated.

16. A non-transitory computer-readable storage medium storing instructions that cause a processor to:
   determine, for a first block of a video, a first prediction sample;
   refine the first prediction sample, based on a first optical flow refinement procedure, with a first prediction sample offset by adding the first prediction sample offset to the first prediction sample to acquire a first final prediction sample, wherein the first prediction sample offset is determined based on at least one first gradient of the first prediction sample, wherein the first gradient is calculated based on at least a difference between two prediction samples acquired based on a location of the first prediction sample, and wherein before being added to the first prediction sample to acquire the first final prediction sample, the first prediction sample offset is clipped to a first range; and perform a conversion between the first block and a bitstream of the video based on the first final prediction sample, wherein the first range is determined based on an input bit depth of the first block;

wherein the instructions further cause the processor to:

determine, for a second block of the video, a second prediction sample;

refine the second prediction sample, based on a second optical flow refinement procedure, with a second prediction sample offset to acquire a second final prediction sample; wherein the second prediction sample offset is determined based on at least one second gradient of the second prediction sample, wherein the second gradient is calculated based on at least a difference between two prediction samples acquired based on a location of the second prediction sample;

clip the second final prediction sample to a second range; and perform a conversion between the second block and the bitstream based on the second final prediction sample.

17. A method performed by a video processing apparatus, wherein the method comprises:

determining, for a first block of a video, a first prediction sample;

refining the first prediction sample, based on a first optical flow refinement procedure, with a first prediction sample offset by adding the first prediction sample offset to the first prediction sample to acquire a first final prediction sample, wherein the first prediction sample offset is determined based on at least one first gradient of the first prediction sample, wherein the first gradient is calculated based on at least a difference between two prediction samples acquired based on a location of the first prediction sample, and wherein before being added to the first prediction sample to acquire the first final prediction sample, the first prediction sample offset is clipped to a first range;

generating the bitstream based on the first final prediction sample, and storing the bitstream to a non-transitory computer-readable medium;

wherein the first range is determined based on an input bit depth of the first block;

wherein the method further comprises:

determining, for a second block of the video, a second prediction sample;

refining the second prediction sample, based on a second optical flow refinement procedure, with a second prediction sample offset to acquire a second final prediction sample; wherein the second prediction sample offset is determined based on at least one second gradient of the second prediction sample, wherein the second gradient is calculated based on at least a difference between two prediction samples acquired based on a location of the second prediction sample;

clipping the second final prediction sample to a second range; and performing a conversion between the second block and the bitstream based on the second final prediction sample.

18. The apparatus of claim 13, wherein the first range is [min, max], min being smaller than 0 and max being larger than 0.

19. The non-transitory computer-readable storage medium of claim 16, wherein the first video block is coded with an affine mode, and the second block is coded with a non-affine mode and is bi-predicated.

20. The method of claim 17, wherein the first video block is coded with an affine mode, and the second block is coded with a non-affine mode and is bi-predicated.

* * * * *